United States Patent
Matsumoto

(10) Patent No.: US 9,170,918 B2
(45) Date of Patent: Oct. 27, 2015

(54) MODEL VERIFICATION SYSTEM, MODEL VERIFICATION METHOD, AND RECORDING MEDIUM

(75) Inventor: Shigeaki Matsumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1019 days.

(21) Appl. No.: 13/260,305

(22) PCT Filed: May 10, 2010

(86) PCT No.: PCT/JP2010/058244
§ 371 (c)(1),
(2), (4) Date: Sep. 24, 2011

(87) PCT Pub. No.: WO2010/131758
PCT Pub. Date: Nov. 18, 2010

(65) Prior Publication Data
US 2012/0011487 A1   Jan. 12, 2012

(30) Foreign Application Priority Data

May 12, 2009   (JP) .............................. 2009-115270
Sep. 3, 2009   (JP) .............................. 2009-203295

(51) Int. Cl.
G06F 9/44   (2006.01)
G06F 11/36   (2006.01)

(52) U.S. Cl.
CPC .............. *G06F 11/3608* (2013.01); *G06F 8/72* (2013.01); *G06F 11/3668* (2013.01); *G06F 8/20* (2013.01)

(58) Field of Classification Search
CPC .......... G06F 8/20; G06F 8/35; G06F 11/3608
USPC ................................................... 717/104, 105
See application file for complete search history.

(56) References Cited

U.S. PATENT DOCUMENTS 7,823,120 B2 * 10/2010 Kazakov et al. .............. 717/104
8,095,918 B2 *  1/2012 Satoh et al. ................... 717/136
(Continued)

FOREIGN PATENT DOCUMENTS

JP   2000-231489 A   8/2000
JP   2001-109649       4/2001
(Continued)

OTHER PUBLICATIONS

Katsuhisa Maruyama, The Institute of Electronics, Information and Communication Engineers Transactions, vol. J88-D-I, No. 2, pp. 175-185, dated Feb. 1, 2005.
(Continued)

*Primary Examiner* — Wei Zhen
*Assistant Examiner* — Brahim Bourzik
(74) *Attorney, Agent, or Firm* — McGinn IP Law Group, PLLC

(57) ABSTRACT

A model verification system includes a formal language conversion part operable to convert model figure data registered as a design pattern in association with a program into formal language expression data based upon an expression format of a predetermined formal language, and a formal language increment part operable to add a modification to a component of the formal language and/or attribute information on the formal language expression data converted by the formal language conversion means to generate formal language expression data of a derivative design. The model verification system conducts refactoring.

15 Claims, 18 Drawing Sheets

(56) References Cited

U.S. PATENT DOCUMENTS

2004/0148152 A1* 7/2004 Horikawa ........................ 703/22
2007/0074178 A1* 3/2007 Schwartz ...................... 717/136
2008/0082959 A1* 4/2008 Fowler .......................... 717/104
2010/0114618 A1* 5/2010 Wilcock et al. .................. 705/7

FOREIGN PATENT DOCUMENTS

| JP | 2003-337697 A | 11/2003 |
| JP | 2004-220453 A | 8/2004 |
| JP | 2004220453 A * | 8/2004 |
| JP | 2005-174120 A | 6/2005 |
| JP | 2008-243019 A | 10/2008 |

OTHER PUBLICATIONS

Shoji Homma, et al., Proceedings of the 63th (2001 the latter period) National Meeting of the Information Processing Society of Japan (1), pp. 1-231 to 1-232, dated Sep. 26, 2001.

* cited by examiner

| Table Name | ID | Design Drawing Stored Location | KPI Value | Formal Language Expression |
|---|---|---|---|---|
| Pattern | 1 | /ABC/DEF/X1.uml | KPI_table.ID1 | <xsd:schema> ···. </xsd:schema> |
| | 2 | /ABC/DEF/X2.uml | KPI_table.ID2 | /path/to/element |
| | 3 | /ABC/DEF/X3.ptn | KPI_table.ID3 | <xsd:schema> ···. </xsd:schema> |
| | 4 | /ABC/DEF/X4.ptn | KPI_table.ID4 | — |

FIG. 15

| Table Name | ID | Formal Language Expression | Derivative Source Pattern |
|---|---|---|---|
| Derivable | 1 | <xsd:schema> ···. </xsd:schema> | Pattern_table.ID1 |
| | 2 | <xsd:schema> ···. </xsd:schema> | Pattern_table.ID1 |
| | 3 | /path/to/element | Pattern_table.ID2 |
| | 4 | /path/to/element | Pattern_table.ID2 |

FIG. 16

| Table Name | ID | From | To | ROI | PASS |
|---|---|---|---|---|---|
| Proposal | 1 | Instance_table.ID3 | Instance_table.ID2 | 100/70 | 1 |
| | 2 | Instance_table.ID3 | Instance_table.ID4 | 90/70 | 1 |
| | 3 | Instance_table.ID3 | Instance_table.ID5 | 90/70 | 1 |

FIG. 17

| Table Name | ID | Design Drawing Stored Location | Information Expression | Format Evaluation Result |
|---|---|---|---|---|
| Instance | 1 | /PQR/SUV1.uml | <xml> ···. </xml> | Pattern_table.ID1 |
| | 2 | /PQR/SUV2.uml | <xml> ···. </xml> | Pattern_table.ID1, Pattern_table.ID2 |
| | 3 | /PQR/SUV3.ptn | <xml> ···. </xml> | Pattern_table.ID5 |
| | 4 | /PQR/SUV4.ptn | <xml> ···. </xml> | Pattern_table.ID6 |

FIG. 18

| Table Name | ID | Instance ID | File Location | Extraction Matching Character String |
|---|---|---|---|---|
| LOG | 1 | Instance_Table.ID1 | /log/app1.log | (¥w) urn:/abc/def/s1 key=start_time value=(¥d) |
| | 2 | Instance_Table.ID1 | /log/app1.log | (¥w) urn:/abc/def/s1 key=end_time value=(¥d) |
| | 3 | Instance_Table.ID2 | /log/app2.log | (¥w) urn:/abc/def/s2 key=incident value=(%d) |
| | 4 | Instance_Table.ID3 | /log/app3.log | (¥w) urn:/abc/def/s3 key=question value=(%d) |
| | 5 | Instance_Table.ID4 | /log/app4.log | (¥w) urn:/abc/def/s3 key=relation_from_ID value=(%s) |
| | 6 | Instance_Table.ID4 | /log/app4.log | (¥w) urn:/abc/def/s3 key=relation_to_ID value=(%s) |
| | 7 | Instance_Table.ID4 | /log/app5.log | (¥w) urn:/abc/def/s4 key=start_time value=(¥d) |
| | 8 | Instance_Table.ID4 | /log/app5.log | (¥w) urn:/abc/def/s4 key=end_time value=(¥d) |
| | 9 | Instance_Table.ID1 | /log/app1.log | (¥w) urn:/abc/def/s1 key=incident value=(¥d) |

FIG. 19

| Table Name | ID | KPI Calculation Function | Recommended Range |
|---|---|---|---|
| KPI | 1 | f(string[], string[]) | REGION:0-100<br>TARGET:50<br>DANGER:25 |
| | 2 | g(string[], int[]) | REGION:0-100<br>TARGET:90<br>DANGER:80 |
| | 3 | h(string[], string[]) | REGION:0-100<br>TARGET:70<br>DANGER:45 |

FIG. 20

| Table Name | ID | Function | Input Data |
|---|---|---|---|
| KPI_VALUE_FROM | 1 | KPI_Table.ID1 | LOG_table.ID1$1, LOG_table.ID2$1 |
| | 2 | KPI_Table.ID2 | LOG_Table.ID3$1, LOG_Table.ID3$2 |
| | 3 | KPI_Table.ID3 | LOG_Table.ID5$2, LOG_Table.ID6$2 |
| | 4 | KPI_Table.ID1 | LOG_Table.ID7$1, LOG_Table.ID8$1 |
| | 5 | KPI_Table.ID2 | LOG_Table.ID4$1, LOG_Table.ID4$2 |

FIG. 21

| Table Name | ID | KPI used for Comparison | Instance | Score |
|---|---|---|---|---|
| Quantity | 1 | KPI_table.ID1 | Instance_table.ID3 | 70 |
| | 2 | KPI_table.ID1 | Instance_table.ID2 | 100 |
| | 3 | KPI_table.ID2 | Instance_table.ID1 | 100 |

FIG. 22

| Table Name | ID | Instance ID | Test Process | Process Input Data | Process Verification Data |
|---|---|---|---|---|---|
| TEST | 1 | Instance_Table.ID1 | /test/set1/process/integration_process1.bpel | /test/set1/input/sample1.xml | /test/set1/output/verify1.xml |
| | 2 | Instance_Table.ID1 | /test/set1/process/integration_process1.bpel | /test/set1/input/sample2.xml | /test/set1/output/verify2.xml |
| | 3 | Instance_Table.ID1 | /test/set1/process/integration_process1.bpel | /test/set1/input/sample3.xml | /test/set1/output/verify3.xml |
| | 4 | Instance_Table.ID1 | /test/set1/process/integration_process1.bpel | /test/set1/input/sample4.xml | /test/set1/output/verify4.xml |
| | 5 | Instance_Table.ID1 | /test/set1/process/integration_process1.bpel | /test/set1/input/sample5.xml | /test/set1/output/verify5.xml |
| | 6 | Instance_Table.ID2 | /test/set2/process/integration_process1.bpel | /test/set2/input/sample1.xml | /test/set2/output/verify1.xml |
| | 7 | Instance_Table.ID2 | /test/set2/process/integration_process1.bpel | /test/set2/input/sample1.xml | /test/set2/output/verify1.xml |
| | 8 | Instance_Table.ID2 | /test/set2/process/integration_process1.bpel | /test/set2/input/sample1.xml | /test/set2/output/verify1.xml |

FIG. 23

CORRESPONDENCE TABLE

| Extension | Header | Formal Language | Information Expression |
|---|---|---|---|
| uml | x-uml | XMLSchema | XML |
| seq | x-sequence | XMLSchema | BPEL2.0 |
| uml2 | x-uml_20 | XMLSchema | XML |

FIG. 24

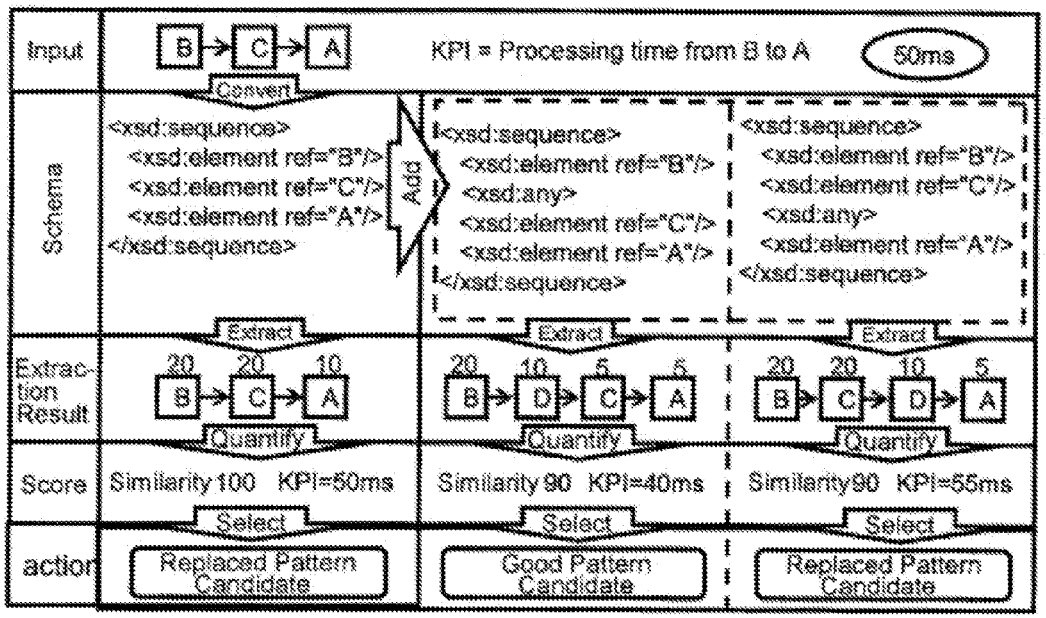

FIG. 25

```
<xsd:element name="process">

<xsd:complexType>
 <xsd:sequence>
  <xsd:element name="invoke">
    <xsd:compexType>
      <xsd:attribute name="operation"  type="xsd:string" default="op1"/>
    </xsd:compelxType>
  </xsd:element>
  <xsd:element name="flow">
    <xsd:complexType>
      <xsd:all>
        <xsd:element name="invoke">
          <xsd:compexType>
            <xsd:attribute name="operation" type="xsd:string" default="op2"/>
          </xsd:compelxType>
        </xsd:element>
        <xsd:element name="invoke">
          <xsd:compexType>
            <xsd:attribute name="operation" type="xsd:string" default="op3"/>
          </xsd:compelxType>
        </xsd:element>
      <xsd:all>
    </xsd:complexType>
  </xsd:element>
 </xsd:sequence>
</xsd:complexType>
</xsd:element>
```

FIG. 30

CORRESPONDENCE TABLE

| Extension | Header | Formal Language | Information Expression |
|---|---|---|---|
| uml | x-uml | XPath | XML |
| seq | x-sequence | XPath | BPEL2.0 |
| uml2 | x-uml_20 | XPath | XML |

FIG. 33 ced as a model. More specifically, the present invention
MODEL VERIFICATION SYSTEM, MODEL VERIFICATION METHOD, AND RECORDING MEDIUM

TECHNICAL FIELD

The present invention relates to a model verification system, a model verification method, and a program for a model verification system to verify a design of a program accumulated as a model. More specifically, the present invention relates to a model verification system, a model verification method, and a model verification program for verifying a design of a program with use of model figure data represented by a human visible form.

BACKGROUND ART

In recent years, a development technique of automatically generating a program from models has been known under the name of the model-driven architecture. With this development technique, a system developer (programmer) can program, without learning a description method using characters of a programming language, by combining predetermined figure expressions into a series of process flows.

A figure expression used in the above model-driven architecture represents an assigned process in a visually comprehensible manner. A program corresponding to the assigned process is associated previously or additionally with that process. The program associated with the figure expression is combined with other figures on the figure expressions and are thus coupled to programs of other figures.

Even if programs associated with such figure expressions or programs gathered to execute a series of processes can obtain the same result, they are classified in dependency upon the level of the skill of a developer or the like into good designed programs which that have concisely been described and no-good designed programs. Therefore, good designs and bad designs are frequently mixed in a program produced by a plurality of developers. A program of a no-good design would be defined as a program that requires a long time for performing a process in comparison with a program of a good design or defined as a program that consumes a large amount of resources, in spite of the fact that the same result as the good design can be obtained. Furthermore, even if a program associated with a figure expression may be a good design peculiar to one system, it may be a bad design used to other systems.

Meanwhile, programs that have been designed in the past are frequently used in product development. In a case where a plurality of programs have been designed in the past and all have been operated correctly, either one of those programs is used without distinguishing between good designed programs and no-good designed programs. On the other hand, if many programs of no-good designs are included in product development, the performance of products is lowered.

Therefore, an action (refactoring) to improve a no-good design into a good design becomes important. However, it is very difficult to manually confirm a program source for refactoring. This is caused by the fact that the improvement action itself depends upon the level of skill and an increase of improvement candidates because all of past systems become improvement candidates and the like. Furthermore, even skilled persons themselves have habits or tendency in refactoring. Thus, it is difficult to properly evaluate a large number of items such as reduction of resources and reduction of a processing time.

Accordingly, there has been desired a system that takes optimization into consideration at the time of development of the system or at the time of modification of the system.

Examples of related systems include Patent Document 1 (JP-A 2003-337697) and Patent Document 2 (JP-A 2005-174120).

A development system for a business system disclosed in Patent Document 1 includes original model storage means, refactoring rule storage means, and optimized model storage means. The development system for a business system operates as follows: An original model is described by a unified expression method using a UML (Unified Modeling Language). A subjective refactoring rule determined for optimization by a skilled person (consultant) is applied to generate an optimized model.

Furthermore, Patent Document 2 discloses an example of technology for analyzing the structural similarity of program data (source) expressed in a language (with characters). A web service connection processing system disclosed in Patent Document 2 compares a definition document of an assumed web service to be connected with a definition document of a new web service to be connected. Then, in a similarity determination process, arguments, namely, parameters of the definition documents of the two web services and data type information of a return value are read, and differences therebetween are extracted. The structural similarity is calculated based upon the extraction result. In the case where the similarity is determined, the system generates a conversion rule and properly calls the web services in accordance with the rule.

DISCLOSURE OF THE INVENTION

Problem(s) to be Solved by the Invention

However, the system disclosed in Patent Document 1 has a problem that the refactoring rule is personalized such that optimized models vary depending upon the consultant. In other words, the quality of an optimized model is determined by the subjectivity of a consultant who has determined a refactoring rule. Furthermore, this system does not actually carry out refactoring as a program. This is apparent from the fact that a refactoring rule (see [0043]) disclosed in Patent Document 1 is described in a natural language. Additionally, effects caused by a change of a program cannot be determined quantitatively.

Furthermore, the system disclosed in Patent Document 2 does not take into consideration, optimization of a generated conversion rule or optimization of a program to which a conversion rule has been applied.

As described above, modification of a program or generation of a refactoring rule mostly relies upon the ability of a skilled person. The modified program is not properly evaluated with regard to many items such as reduction of resources or reduction of a processing time as descried above. In other words, it has been desired to provide a mechanism for automatically evaluating a program generated by an unskilled person and also verification means for a system design that can support skilled persons.

The present invention has been made in view of the above problems. It is an object of the present invention to provide a model verification system that can automatically collect an original design to be converted and a derivative design that is different from the original design for a model verification by converting design data expressed in the form of diagrams (object models) into a formal language expression and automatically increasing variations with use of data that have been converted into the formal language expression.

Means to Solve the Problem

A model verification system according to the present invention is characterized by comprising: a formal language conversion part operable to convert model figure data registered as a design pattern in association with a program into formal language expression data based upon an expression format of a predetermined formal language; and a formal language multiplication or increment part operable to add a modification to a component of the formal language and/or attribute information on the formal language expression data converted by the formal language conversion part to generate formal language expression data of a derivative design in a virtual manner.

Effect(s) of the Invention

According to the present invention, there can be provided a model verification system that carries out a model verification, by converting design data expressed in the form of diagrams into a formal language (e.g., XML Schema) or the like and automatically increases or increments variations in the formal language and that can automatically collect an original design which is a conversion resource of a formal language and a derivative design which is different from the original design.

BRIEF DESCRIPTION OF DRAWINGS:

FIG. 15 is a diagram showing a configuration example of a "Pattern" table stored in a pattern accumulation part of the embodiment.

FIG. 16 is a diagram showing a configuration example of a "Derivable" table stored in the pattern accumulation part of the embodiment.

FIG. 17 is a diagram showing a configuration example of a "Proposal" table stored in the pattern accumulation part of the embodiment.

FIG. 18 is a diagram showing a configuration example of an "Instance" table stored in an existing system design accumulation part of the embodiment.

FIG. 19 is a diagram showing a configuration example of a "LOG" table stored in an existing system execution log accumulation part of the embodiment.

FIG. 20 is a diagram showing a configuration example of a "KPI" table stored in a KPI (Key Performance Indicator) calculation method storage part of the embodiment.

FIG. 21 is a diagram showing a configuration example of a "KPI_VALUE_FROM" table stored in the KPI calculation method storage part of the embodiment.

FIG. 22 is a diagram showing a configuration example of a "Quantity" table stored in the KPI calculation method storage part of the embodiment.

FIG. 23 is a diagram showing a configuration example of a "TEST" table stored in an existing system test data accumulation part of the embodiment.

FIG. 24 is a diagram showing a configuration example of a correspondence table referred to at the formal language conversion part and the design extraction part of the embodiment.

FIG. 25 is an explanatory diagram schematically showing multiplication and quantification of a schema in Example 1.

FIG. 30 is an explanatory diagram showing results in which the input design drawing of Example 2 has been converted into an XML schema.

FIG. 33 is a diagram showing a configuration example of a correspondence table referred to at the formal language conversion part and the design extraction part in Example 3.

MODE(S) FOR CARRYING OUT THE INVENTION

Next, embodiments of the present invention will be described in detail with reference to the drawings.

Figure 1:
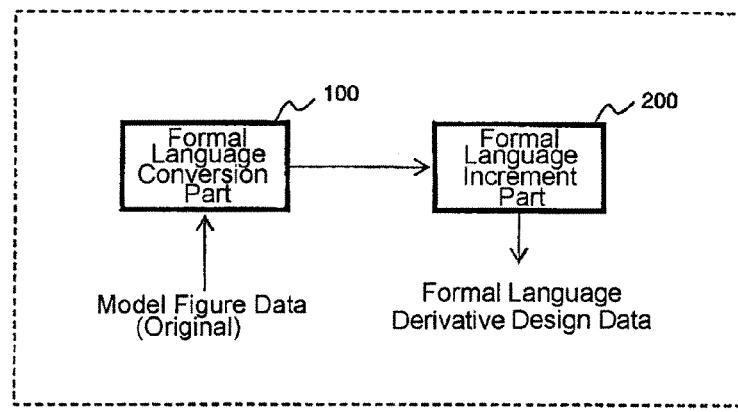
FIG. 1 is a functional block diagram showing part of a configuration of a model verification system according to a first embodiment.
Figure 2:
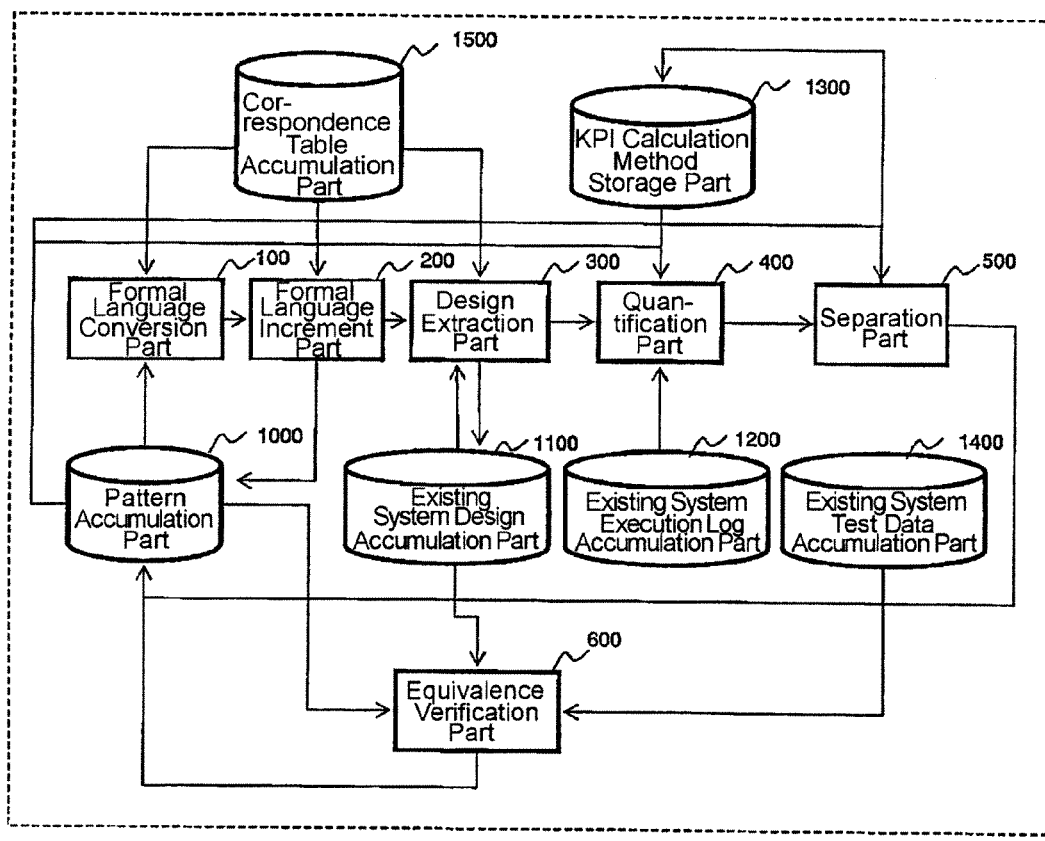
FIG. 2 is a functional block diagram showing a configuration of the model verification system according to the first embodiment.

FIG. 1 is a functional block diagram partly showing a configuration of a model verification system according to a first embodiment. FIG. 2 is a functional block diagram showing a configuration of the model verification system according to the first embodiment as a whole.

Referring to FIGS. 1 and 2, the first embodiment of the present invention includes a formal language conversion part 100, a formal language increment or multiplication part 200, a design extraction part 300, a quantification part 400, a separation part 500, an equivalence verification part 600, a pattern accumulation part 1000, an existing system design accumulation part 1100, an existing system execution log accumulation part 1200, a KPI (key performance indicator) calculation method storage part 1300, an existing system test data accumulation part 1400, and a correspondence table accumulation part 1500, all of which are operated by a program control.

Typical model figures (object model data) used for reference in design are registered (stored) in the pattern accumulation part 1000. Furthermore, derivative designs generated from the typical model figures are registered in the pattern accumulation part 1000. Moreover, improvement proposals indicating effects that would be obtained when a plurality of designs are replaced with other designs are registered in the pattern accumulation part 1000. Furthermore, a KPI value reference, which is an index for evaluation of the typical model figures, is recorded in the pattern accumulation part 1000.

The existing system design accumulation part 1100 stores therein a plurality of pieces of design information. Those pieces of design information relate to design information of a system actually operating (existing system) and relate to design information having various levels of performance, such as designs having room for improvement and excellent designs.

The existing system execution log accumulation part 1200 stores therein the location at which logs of systems operated by a plurality of designs are stored and regular expressions for extracting important information from the logs.

The KPI calculation method storage part 1300 stores therein a recommended range of a KPI, a function for calculating a KPI value, and a reference location of log data at which the function is input. Furthermore, the KPI calculation method storage part 1300 stores therein a KPI value calculated by using an actual log.

The existing system test data accumulation part 1400 stores therein test data used to confirm operations of a plurality of designs. Furthermore, the existing system test data accumulation part 1400 records input data required to execute a test case and validation data indicative of an expected result after the execution.

The correspondence table accumulation part 1500 accumulates or stores correspondence tables used for conversion of a formal language and used for extraction of a design. The correspondence tables are referred to by the formal language conversion part 100 or the like.

Figure 3:
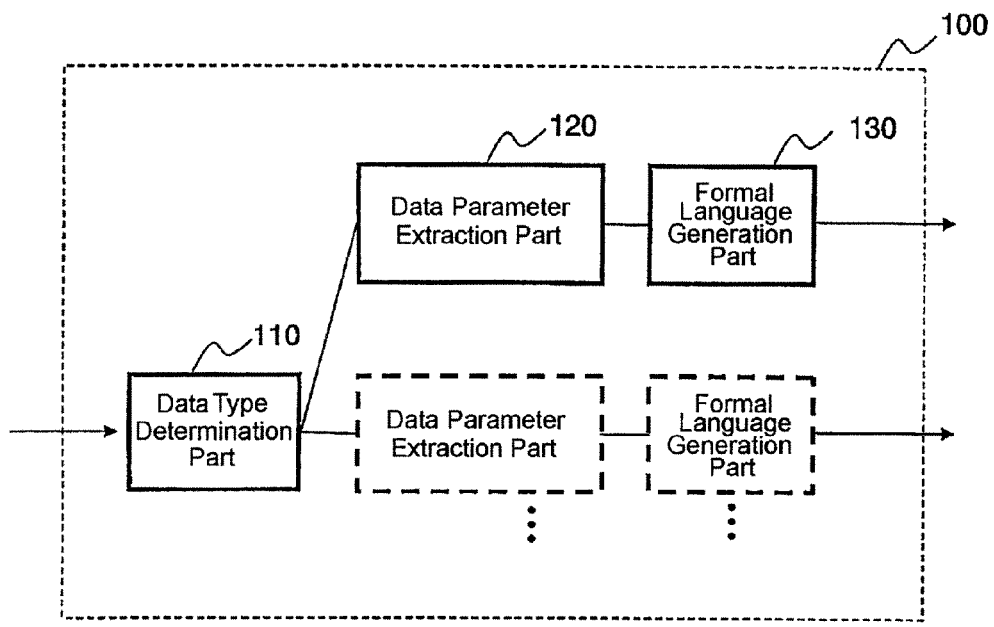
FIG. 3 is a block diagram showing a configuration of a formal language conversion part 100.

FIG. 3 is a block diagram showing a configuration of the formal language conversion part 100. The formal language conversion part 100 includes a data type determination part 110, data parameter extraction parts 120, and formal language expression generation parts 130.

The respective parts schematically operate as follows:

The data type determination part 110 reads a file that describes a model figure registered as a design pattern from the pattern accumulation part 1000, identifies an extension of the file, type information defined at a header of the file, or the like, and transfers the file to an appropriate data parameter extraction part 120 based upon the identified information.

The data parameter extraction part 120 extracts parameters that specify the model figure from the content of the file and transfers the parameters to the formal language generation part 130. Examples of the parameters include the relationship between elements included in a model and the multiplicity of those elements.

The formal language generation part 130 generates a formal language expression (data) from the extracted parameters. Examples of the formal language expression include XML schema, XPath, Regular Language description for XML, and the like. The generated data expressed in the formal language are transmitted to the formal language increment part 200.

The formal language conversion part 100 has a structure capable of adding a pair of the data parameter extraction part 120 and the formal language expression generation part 130 so as to correspond to the number of types determined by the data type determination part 110. The formal language conversion part 100 can cope with a new model figure that will be defined in the future (including an extension and type information).

Figure 4:
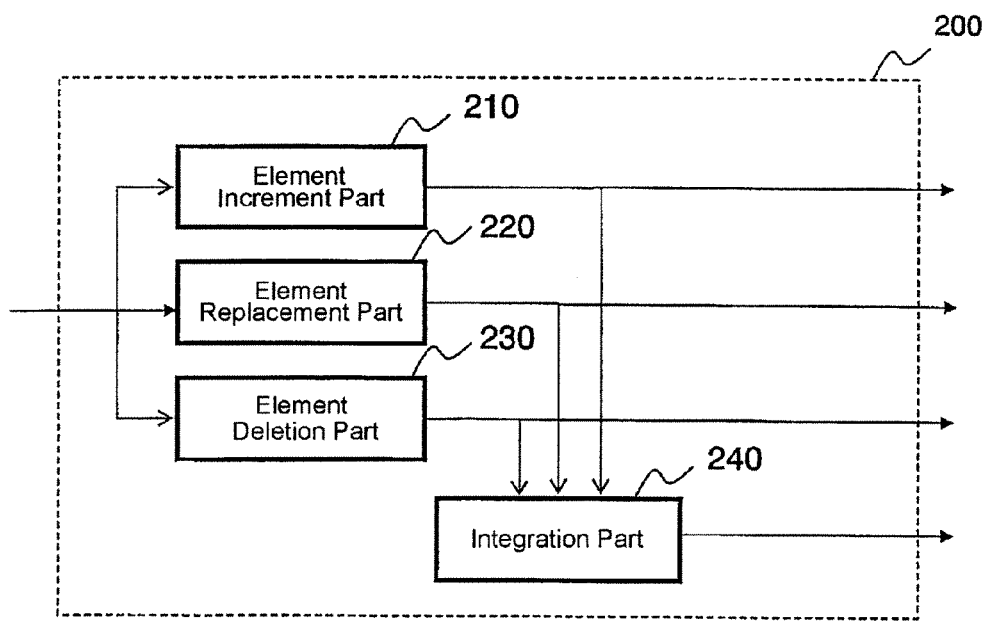
FIG. 4 is a block diagram showing a configuration of a formal language increment part 200.

FIG. 4 is a block diagram showing a configuration of the formal language increment part 200. The formal language increment part 200 includes an element increment or multiplication part 210, an element replacement part 220, an element deletion part 230, and an integration part 240.

The respective parts simply operate as follows:

The element increment part 210 inserts data indicative of an "arbitrary element" into the data expressed in the formal language. A system user can change an upper limit of the number of arbitrary elements to be inserted.

The element replacement part 220 replaces part of the data expressed in the formal language with data indicative of an "arbitrary element." An upper limit of the number of arbitrary elements to be replaced is determined depending upon the size of the data expressed in the formal language.

The element deletion part 230 deletes part of the data expressed in the formal language. An upper limit of the number of arbitrary elements to be deleted is determined depending upon the size of the data expressed in the formal language.

The integration part 240 combines the results of the element increment part 210, the element replacement part 220, and the element deletion part 230 and generate combined data. The combination of the results may be based upon the size of the data expressed in the formal language or may be based upon any instruction from a system user.

The formal language increment part 200 transfers all data (namely, derivative formal language expression data) generated from the element increment part 210, the element replacement part 220, the element deletion part 230, and the integration part 240 and the original data (formal language expression data) generated at the formal language conversion part 100 to the design extraction part 300.

The formal language increment part 200 may not always have all of the element increment part 210, the element replacement part 220, the element deletion part 230, and the integration part 240. The formal language increment part 200 may be operated with only one of those parts.

Figure 5:
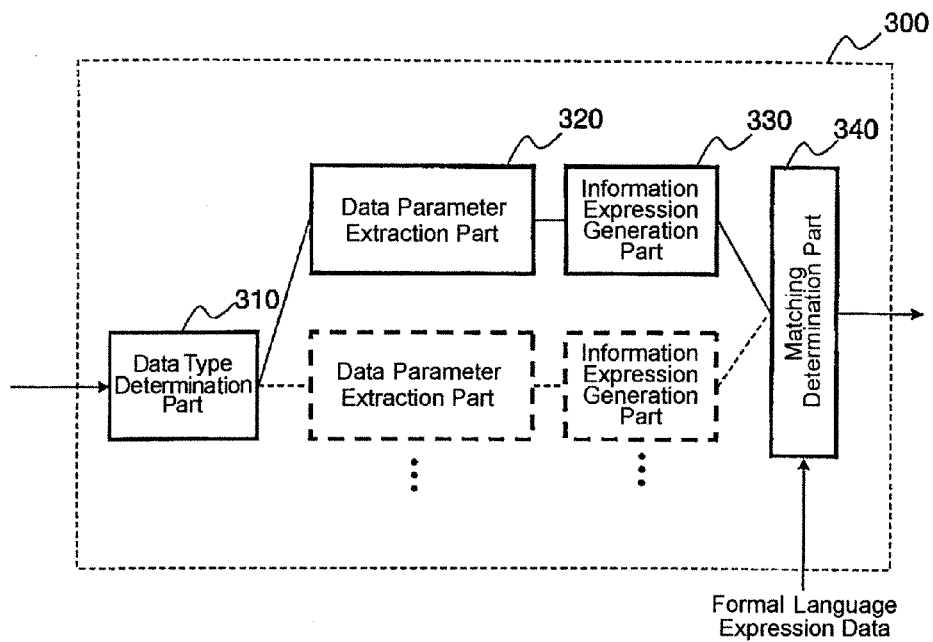
FIG. 5 is a block diagram showing a configuration of a design extraction part 300.

FIG. 5 is a block diagram showing a configuration of the design extraction part 300. The design extraction part 300 includes a data type determination part 310, data parameter extraction parts 320, information expression generation parts 330, and a matching determination part 340.

The respective parts roughly operate as follows:

The data type determination part 310 extracts one file of design information from the existing system design accumulation part 1100, identifies an extension of the file or type information defined at a header of the file, and transfers the file to an appropriate data parameter extraction part 320 based upon the identified information.

The data parameter extraction part 320 extracts parameters that specify the model figure from the content of the file.

The information expression generation part 330 expresses data of the model figure in a different information description expression based upon the extracted parameters. This information description expression is limited to a form defined such that the formal language expression generated in the formal language expression generation part 130 enables verification, extraction of elements, and the like with use of the correspondence table recorded in the correspondence table accumulation part 1500. For example, if the formal language expression is an XML schema or XPath, then the information description expression is XML. Data in the form of the XML schema can be used for grammar check or for extraction check of part of the grammar in the XML language or the BPEL language (which will be described later). Furthermore, data in the form of XPath can be used to extract part of sentences of information described in the XML language or the BPEL language (mentioned later).

The matching determination part 340 determines whether or not the data expressed in the formal language are matched with the data expressed in the information description expression, notifies the quantification part 400 of the result (determination result data), and records the result in the existing system design accumulation part 1100.

Figure 6:
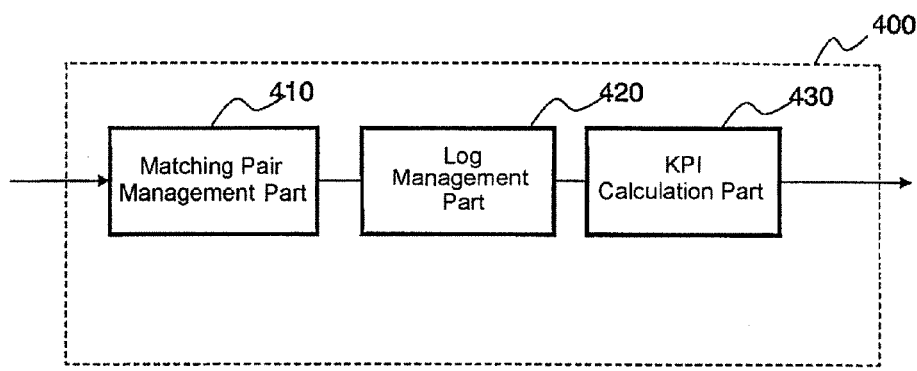
FIG. 6 is a block diagram showing a configuration of a quantification part 400.

FIG. 6 is a block diagram showing a configuration of the quantification part 400. The quantification part 400 includes a matching pair management part 410, a log management part 420, and a KPI calculation part 430.

The respective parts roughly operate as follows:

The matching pair management part 410 stores therein a pattern ID and an instance ID of the data (determination result data) that have been matched at the design extraction part 300.

The log management part 420 acquires a log that matches the instance ID from the existing system execution log accumulation part 1200.

The KPI calculation part 430 follows a KPI value reference stored in the pattern accumulation part 1000 from the pattern ID and extracts a recommended KPI range value stored in the KPI calculation method storage part 1300. Furthermore, the KPI calculation part 430 similarly follows the KPI value reference and acquires a KPI calculation function stored in the KPI calculation method storage part 1300. Moreover, the KPI calculation part 430 applies the matched log to the KPI calculation function to obtain a value and transfers the result data to the separation part 500.

Figure 7:
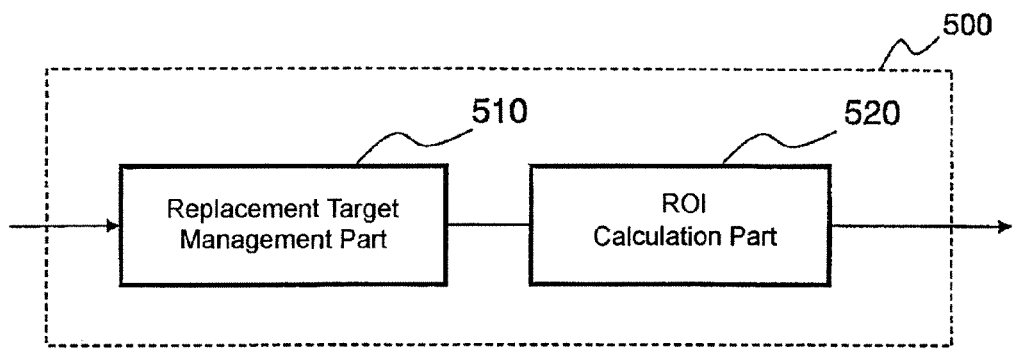
FIG. 7 is a block diagram showing a configuration of a separation part 500.

FIG. 7 is a block diagram showing a configuration of the separation part 500. The separation part 500 includes a replacement target management part 510 and an ROI (Return on Investment) calculation part 520.

The respective parts roughly operate as follows:

The replacement target management part 510 refers to a quantification result (format evaluation result) of the design information recorded on the existing system design accumulation part 1100, organizes instances referring to the same pattern into one group, and compares KPI values obtained from the quantification part 400. An instance having the highest score in the same group is recorded as a replacement target candidate (replacing candidate) in the pattern accumulation part 1000. Furthermore, instances other than the instance having the highest score are recorded as replacement source candidates (replaced candidates) in association with the replacing candidate. The relationship between those candidates is recorded.

The ROI calculation part 520 divides the KPI value of the replacement target candidate by the KPI values of the replacement source candidates to calculate ratios, calculates quantitative effects in the case where the replacement is made, and records the quantitative effects as an ROI value in the pattern accumulation part 1000.

Figure 8:
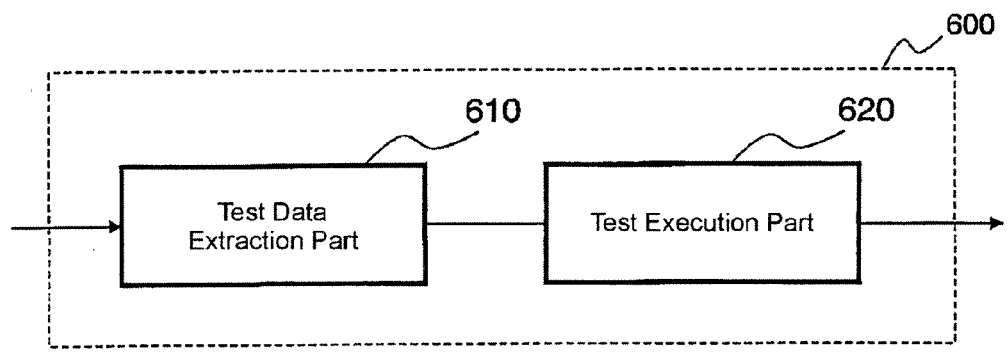
FIG. 8 is a block diagram showing a configuration of an equivalence verification part 600.

FIG. 8 is a block diagram showing a configuration of the equivalence verification part 600. The equivalence verification part 600 includes a test data extraction part 610 and a test execution part 620.

The respective parts roughly operate as follows:

The test data extraction part 610 extracts a test case that uses only a portion of the instances of the replacement source candidates that matches the pattern from the existing system test data accumulation part 1400. The test data extraction part 610 acquires input data required to execute the test case and validation data indicative of an expected result of the execution.

The test execution part 620 applies the input data and validation data acquired for each of the replacement source candidates to the test case of the replacement target candidate, conducts the test, and records the result of whether or not the replacement can be made in the pattern accumulation part 1000.

With such an operation, the improvement effects are finally demonstrated quantitatively with score ratios of scores of the improvement sources and a score of the improvement target by using the test result.

Next, an operation of the entire model verification system according to the present embodiment will be described in detail with reference to FIGS. 3 to 8 and flow charts of FIGS. 9 to 14.

In the following description, it is assumed that the model figure being handled is a sequence diagram, that the formal language expression is an XML schema, and that the information description expression is XML. Furthermore, a "Pattern" table, a "Derivable" table, a "Proposal" table, a "KPI_VALUE_FROM" table, a "Quantity" table, a "KPI" table, an "Instance" table, a "LOG" table, and a "TEST" table are stored in various kinds of storage means and used for various kinds of operations.

Now each of the tables will be described.

The "Pattern" table (design pattern table) stores therein the location (address) at which design data of a typical model figure are stored, an evaluation index (KPI value) of the design, and a character string of the formal language expression generated from the model figure at the formal language conversion part 100 in association with an ID. The KPI value is a foreign key and refers to the "KPI" table.

The "Derivable" table stores therein a formal language expression of a typical model figure multiplied by the formal language increment part 200. Furthermore, a derivation source pattern, from which the formal language expression originates, is also stored in the "Derivable" table. The value of the derivation source pattern is a foreign or an external key and refers to the "Pattern" table.

The "Proposal" table stores therein a design candidate to be improved and a design candidate as the content of improvement. Particularly, a candidate to be improved is listed as a foreign key to the "Instance" table in the "From" field, and a candidate of the content of improvement is listed as a foreign key to the "Instance" table in the "To" field. The "Proposal" table has a "ROI" field, which quantitatively demonstrates improvement effects if the design of the "From" field is replaced with the design of the "To" field, and has a "PASS" field, in which a pass/fail result of the replacement test is recorded.

The "KPI" table (key performance indicator table) stores therein a function for calculating a KPI, a range of the KPI, a desired value of the KPI, and a lowest limit of the KPI.

The "KPI_VALUE_FROM" table (key performance indicator table relationship table) associates a function for calculating a KPI with log data given as an input of the function. A function for calculating a KPI is listed as a foreign key to the "KPI" table in the "Function" field. Furthermore, input data of the function are listed as a foreign key to the "LOG" table in the "Input Data" field.

The "Quantity" table (quantitative evaluation table) stores therein a score in a case where design information is evaluated with an index. A foreign key to the "KPI" table is described or stored in the KPI column or field used for comparison. Furthermore, a foreign key to the "Instance" table is described in the column or field of "Instance".

The "Instance" table (exemplification table) stores therein a stored location of design information, a character string with which the design information is expressed in an information language, and reference data to a similar pattern (design information). The reference data are a foreign key to the "Pattern" table.

The "LOG" table stores therein a stored location of an operation log of a system, which is generated based upon the design information, together with data which are to be extracted from the log which are described in a regular expression. The "Instance ID" column or field, which indicates design information, is a foreign key to the "Instance" table.

The "TEST" table stores therein process data, input data, and verification data that are used in a test for ensuring an operation of the system, in association with design information. The "Instance ID" column or field, which indicates design information, is a foreign key to the "Instance" table.

First, description will be made with reference to FIGS. 3 and 9 about an operation of the formal language conversion part 100 for converting a model figure into a formal language.

Figure 9:
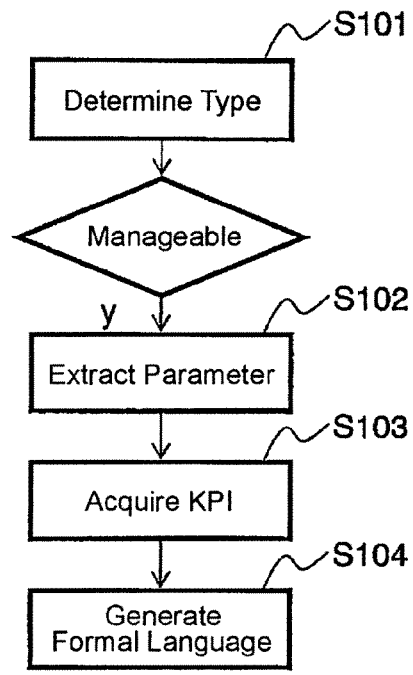
FIG. 9 is a flow chart showing an operation of the formal language conversion part 100.

FIG. 9 is a flow chart showing an operation of the formal language conversion part 100.

The data type determination part 110 collates an extension ".uml" of a file that describes an inputted model figure with the correspondence table (see FIG. 24 or 33) stored in the correspondence table accumulation part 1500, determines whether or not the file can be read and managed, and transfers the manageable data to the data parameter extraction part 120 (Step S101).

The data parameter extraction part 120 extracts parameters of the service components and the calling order from a sequence diagram (Step S102), which is a model figure.

Furthermore, the data parameter extraction part 120 acquires a corresponding external reference of the "KPI Value" field from the "Pattern" table of the pattern accumulation part 1000 (Step S103).

The formal language generation part 130 generates a formal language expression (data) such that the extracted parameters conform to the format described in the "Formal Language" field of the correspondence table (Step S104).

Next, an operation of the formal language increment part 200 to increment or multiply formal language expression data will be described with reference to FIGS. 4 and 10. In the following description, formal language expression data are described as a typical pattern, and formal language expression data of a derivative design are described as a derivative pattern.

Figure 10:
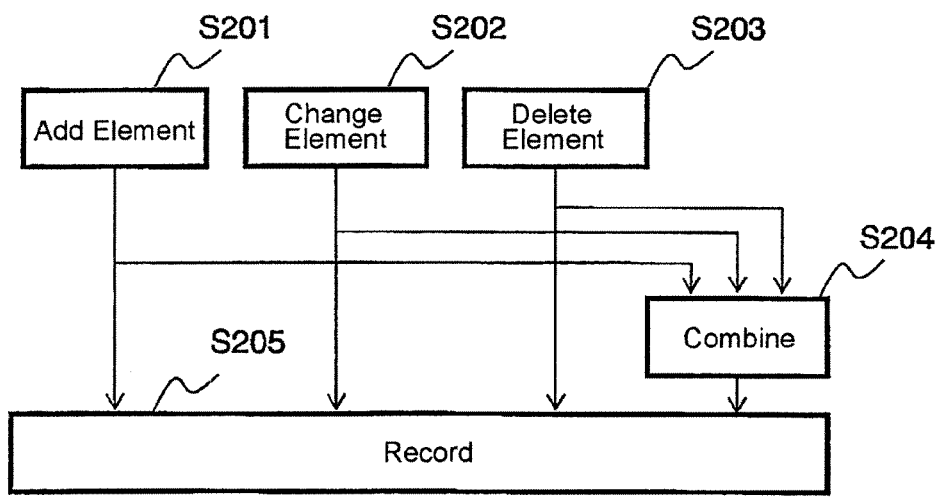
FIG. 10 is a flow chart showing an operation of the formal language increment part 200.

FIG. 10 is a flow chart showing an operation of the formal language increment part 200.

The formal language increment part 200 refers to the correspondence table of FIG. 24 or 33, performs a formal language increment concerned with the typical pattern, and generates a derivative pattern.

In the formal language increment, the element increment part 210, the element replacement part 220, the element deletion part 230, and the integration part 240 respectively perform a derivative design generation process in parallel, and perform an element addition (Step S201), an element replacement (Step S202), or an element deletion (Step 5203) on the typical pattern or combine an element addition, an element replacement, and an element deletion (Step S204) to thus generate a derivative pattern.

Finally, the obtained derivative pattern is recorded in the "Formal Language Expression" field of the "Derivable" table shown in FIG. 16 (Step S205), which is stored in the pattern accumulation part 1000.

Figure 32:
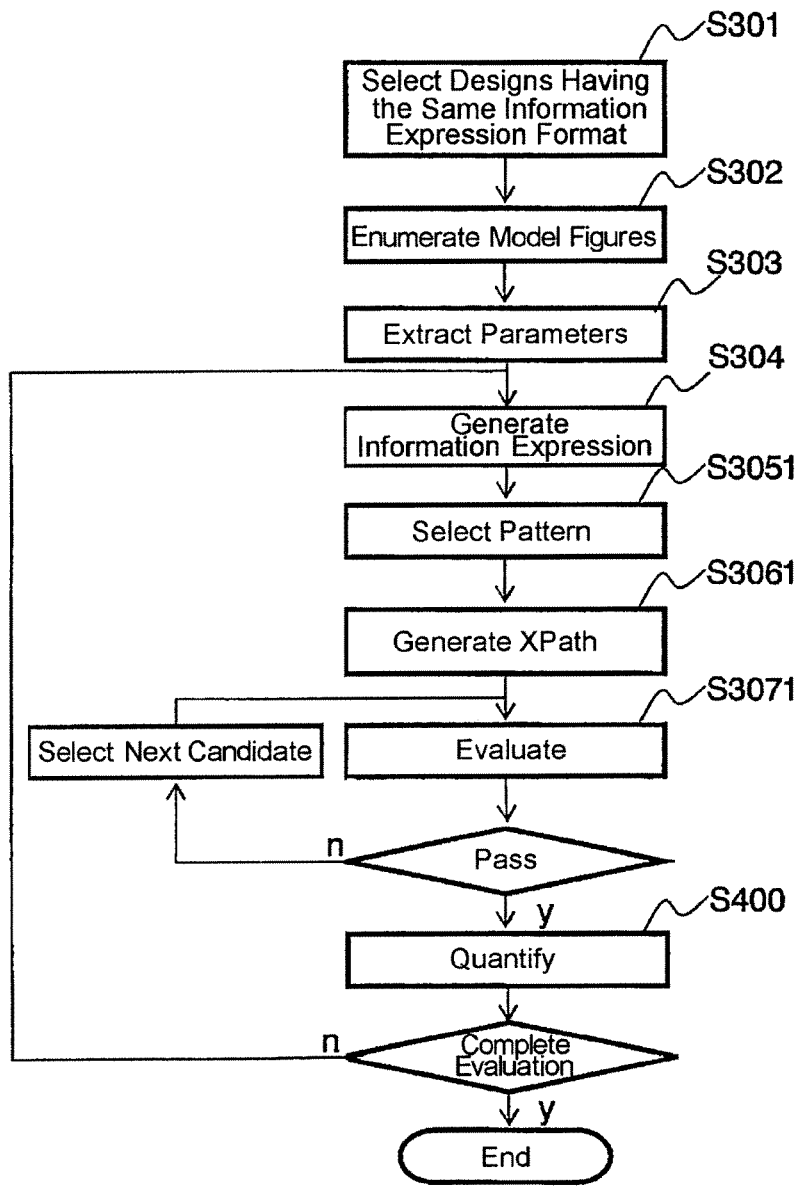
FIG. 32 is a flow chart showing an operation of the design extraction part 300 in Example 3.

Next, description will be made with reference to FIGS. 5, 11, and 32 about an operation of the design extraction part 300, which is executed to extract a design that matches the incremented schema or XPath.

Figure 11:
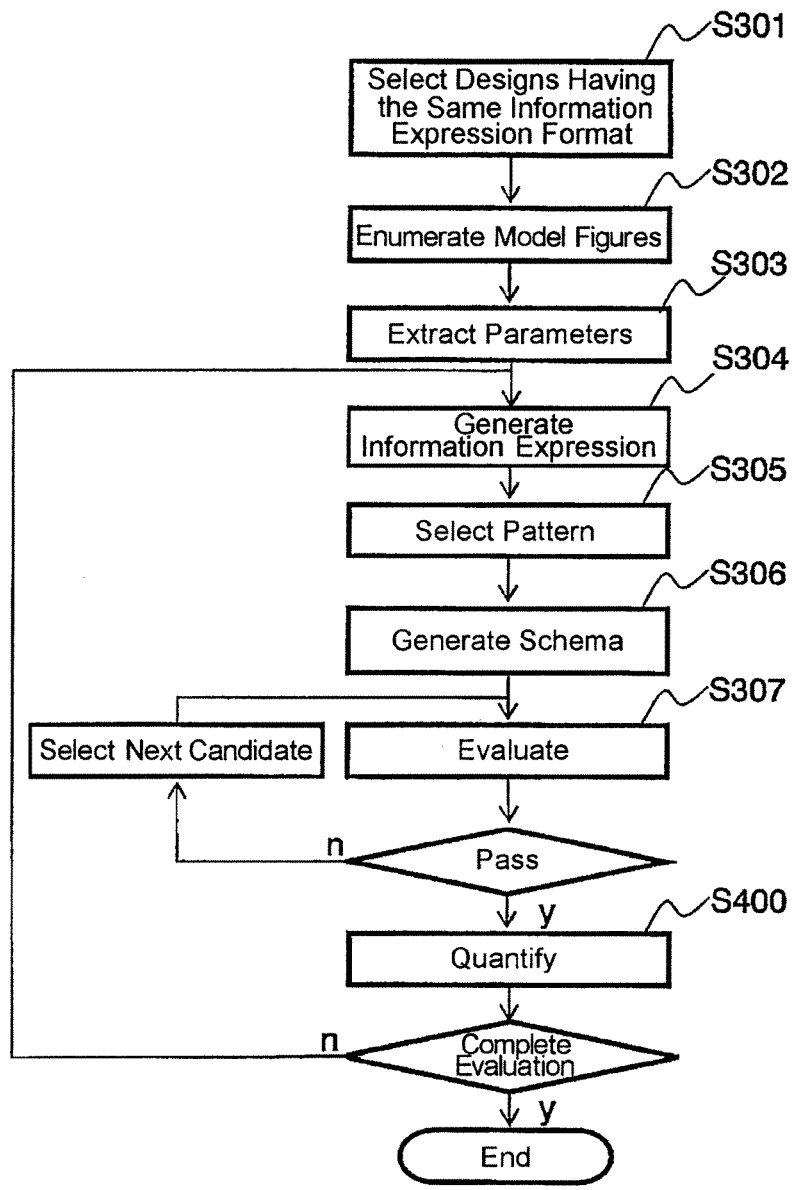
FIG. 11 is a flow chart showing an operation of the design extraction part 300.

FIG. 11 is a flow chart showing an operation of the design extraction part 300.

The data type determination part 310 enumerates IDs having a matched extension of a file name in the "Design Drawing Stored Location" field of the "Instance" table of FIG. 18 (Step S301). In this case, since ID1 and ID2 have the same extension and ID3 and ID4 have the same extension, two pairs are enumerated. The following operation proceeds in the case of the extension ".uml," which is common to ID1 and ID2 in the "Instance" table.

Furthermore, the data type determination part 310 refers to the correspondence table of FIG. 24 or 33 and recognizes that files having different extensions have the same information expression. With regard to the extensions of "uml" and "uml2" that have an information expression of XML, model figures of the files having those extensions are extracted from the "Instance" table as candidates which are to be converted into the information expression format. Since no design has an extension of "uml2" in FIG. 18, ID1 and ID2 are converted into the information expression format (Step S302).

Then the data parameter extraction part 320 selects files having an extracted extension of "uml" or "uml2" and extracts parameters of those files (Step S303).

Subsequently, the information expression generation part 330 generates information expression data in the XML format based upon the extracted parameters (Step S304).

Next, in the case where the formal language expression is set to be an XML schema (the correspondence table of FIG. 24 is used), the matching determination part 340 compares the number of tags specific to the XML schema that appear in the formal language expression of the "Derivable" table (the tag name is "element" or "any") with the number of types of tags in the information expression of the "Instance" table. The matching determination part 340 extracts combinations in which the former is not less than the latter (Step S305 of FIG. 11). In the case where the formal language expression is set to be XPath (the correspondence table of FIG. 33 is used), the matching determination part 340 compares the number of words separated by "/" with the number of the hierarchy of tags in the information expression of the "Instance" table. The matching determination part 340 extracts combinations in which the former is not more than the latter (Step S3051 of FIG. 32).

In the following process, each of XML instances that meet the conditions is taken out and compared with one derivative pattern. Furthermore, when one derivative pattern is to be selected, a derivative pattern having the smallest number of tags is first selected from the derivative patterns.

Next, in the case the formal language expression is set to be an XML schema, the matching determination part 340 replaces the value of the name attribute of the root element of the pattern with the root tag name of the XML instance to generate an XML schema (Step S306). In the case where the formal language expression is set to be XPath, the matching determination part 340 adds "axis" to the root element name of the pattern to generate an XPath form (Step S3061).

Then, in the case where the formal language expression is set to be an XML schema, the matching determination part 340 examines, based upon the schema verification technology, whether or not XML of the information expression matches the format of the XML schema generated from the pattern. If there is no error as a result of the examination, the matching determination part 340 determines that the test has passed and notifies the quantification part 400 of the determination result data. If there is an error, the matching determination part 340 determines that the test has failed and repeats the examination on the next candidate of the XML instances (Step S307). In the case where the formal language expression is set to be XPath, the matching determination part 340 performs an operation using the XPath form on XML of the information expression and examines whether or not one or more elements are present in the result. If one or more elements are present, the matching determination part 340 determines that the test has passed and notifies the quantification part 400 of the determination result data. If there is an error, the matching determination part 340 determines that the test has failed and repeats the examination on the next candidate of the XML instances (Step S3071).

Thereafter, the quantification part 400 receives the determination result data and calculates a KPI value of the design of the passed XML instance (Step S400).

Figure 12:
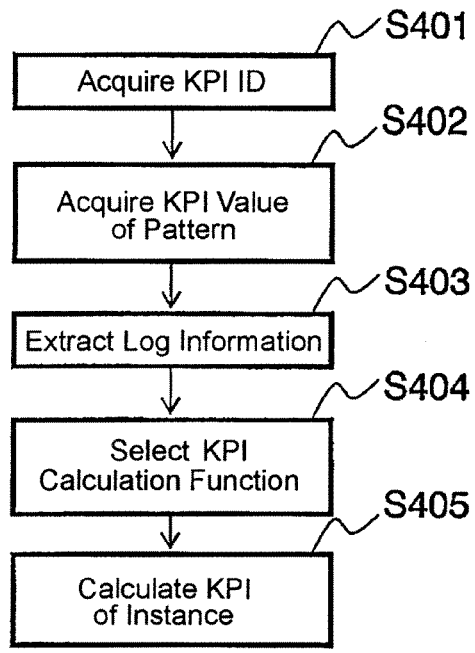
FIG. 12 is a flow chart showing an operation of the quantification part 400.

Next, description is made with reference to FIGS. 6 and 12 about an operation of the quantification part 400 which is executed to extract a KPI value of a pattern and to calculate a KPI value of an XML instance.

FIG. 12 is a flow chart showing an operation of the quantification part 400.

First, the quantification part 400 refers to the "Pattern" table shown in FIG. 15, which is stored in the pattern accumulation part 1000, and acquires a KPI ID for calculating the value of the pattern from the "KPI Value" field (Step S401).

The KPI ID indicates the value of the "ID" field of the "KPI" table shown in FIG. 20, which is stored in the KPI calculation method storage part 1300. Since a KPI calculation function and a recommended range are described in the "KPI" table, the KPI value as the value of the pattern adopts a value specified by the "TARGET" property of the recommended range. Thus, the quantification part 400 acquires the value of the "KPI" table (Step S402).

Then, in order to calculate a KPI value of the XML instance, the quantification part 400 acquires a character string for extracting the instance ID of the existing system, the location of a log file when the design is applied, and specific data in the log file from the "LOG" table shown in FIG. 19 (Step S403), which is stored in the existing system execution log accumulation part 1200. Thus, the instance ID is associated with letters and numerical data required for the KPI calculation.

The quantification part 400 refers to the "KPI_VALUE_FROM" table stored in the KPI calculation method storage part 1300 (see FIG. 21), acquires a log ID from the "Input Data" field, acquires a KPI ID of the "KPI" table from the "Function" field, and selects a KPI calculation function (Step S404).

The quantification part 400 applies the specific data in the log file as an input value to the selected KPI calculation function to calculate the KPI value of the XML instance and stores it in the "Score" field of the "Quantity" table shown in FIG. 22 (Step S405), which is stored in the KPI calculation method storage part 1300.

When a log for calculating the same KPI as the pattern cannot be acquired, the quantification part 400 presents a warning to a user. This operation is repeated to calculate all of KPI values of the XML instances that match one pattern. Furthermore, the operation is performed on a plurality of patterns.

Next, an operation of selecting, in the separation part 500, good designs and no-good designs based upon the KPI values of the XML instances that have been acquired by the quantification part 400 will be described with reference to FIGS. 7 and 13.

Figure 13:
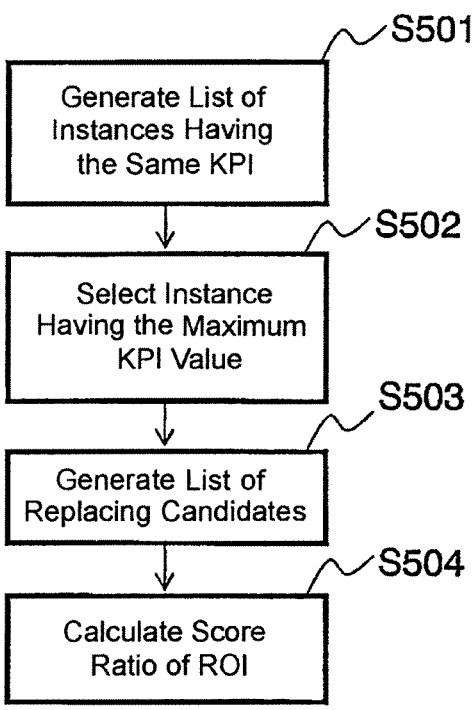
FIG. 13 is a flow chart showing an operation of the separation part 500.

FIG. 13 is a flow chart showing an operation of the separation part 500.

First, the replacement target management part 510 refers to the "Quantity" table and extracts, as a list, data having the same value in the "KPI used for Comparison" field but having different values in the "Instance" field. Thus, the replacement target management part 510 generates a set of list data (Step S501).

The replacement target management part 510 selects an instance ID having the best KPI value from the set of list data (Step S502).

The replacement target management part 510 stores an ID of an instance included in the set of list data into the "From" field of the "Proposal" table (see FIG. 17), which is stored in the pattern accumulation part 1000. The replacement target management part 510 stores an ID of an instance having the best score of the KPI values into the "To" field (Step S503). In other words, an ID of an instance having the highest KPI value, which can be regarded as a good design, is stored in the "To" field, while an ID of an instance to be replaced, which can be regarded as a no-good design, is stored in the "From" field.

Next, the ROI calculation part 520 calculates an ROI value in accordance with the following formula (1).

$$\text{ROI value} = (\text{KPI of a standard pattern})/(\text{KPI of an XML instance}) * (\text{the number of components of the standard pattern})/(\text{the number of components of the XML instance}) \qquad \text{Formula (1)}$$

Subsequently, the ROI calculation part 520 stores a score ratio into the "ROI" field of the "Proposal" table. The denominator of the score ratio is a score of an ROI value of an instance ID described at the "From" field, and the numerator of the score ratio is a score of an ROI value of an instance ID described at the "To" field (Step S504).

Next, an operation of determining, in the equivalence verification part 600, the replaceablity will be described with reference to FIGS. 8 and 14.

Figure 14:
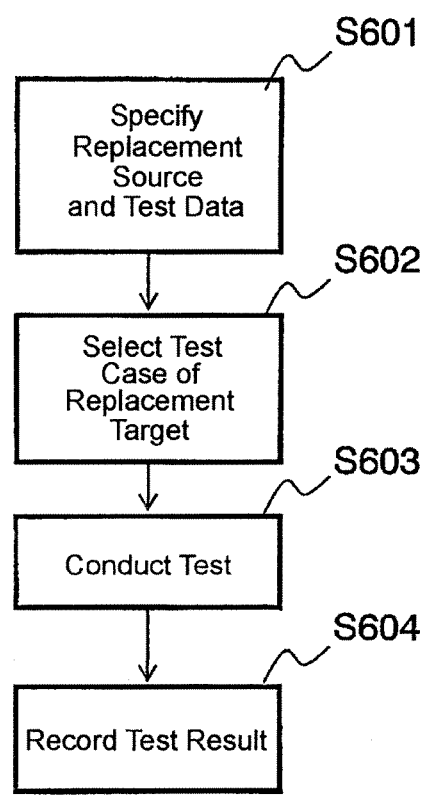
FIG. 14 is a flow chart showing an operation of the equivalence verification part 600.

FIG. 14 is a flow chart showing an operation of the equivalence verification part 600.

With use of test data, the equivalence verification part 600 verifies whether or not the instance ID described at the "From" field of the "Proposal" table can be replaced with the instance ID described at the "To" field.

First, the test data extraction part 610 extracts a test case wherein only a portion matched in pattern is included, from test data that have been prepared for verification of an instance (replaced candidate) described at the "From" field of the "Proposal" table. In order to achieve this process, an instance to be verified is selected from the "Instance ID" field of the "TEST" table which is shown in FIG. 23 and which is stored in the existing system test data accumulation part 1400. All of the process files used by the instance are verified as follows: The test data extraction part 610 extracts files that call only a service matched with the pattern, from files described at the "Test Process" field by line-by-line character string matching on the codes (Step S601).

Similarly, the test data extraction part 610 extracts a test case wherein only a portion matched with the pattern, from test data that have been prepared for verification of an instance (replacing candidate) described at the "To" field of the "Proposal" table (Step S602).

Using the instance ID and the test process ID extracted from the test data extraction part 610, the test execution part 620 provides the test case of the replacement target with the test process of the replacement source, the process input data of the replacement source, and the process verification data of the replacement source and executes a test (Step S603).

Furthermore, the test execution part 620 sets the execution result of 1 at the "PASS" field of the "Proposal" table if the test has passed or the execution result of 0 if the test has failed (Step S604).

Next, advantageous effects of the embodiment of the present invention will be described.

In a model verification system according to the present embodiment, the aforementioned operations convert design data expressed in the form of diagrams into a formal language or the like and also make it possible to automatically increase variations in the formal language.

Furthermore, comparison between model figures generated for human visual confirmation can be made mechanically. This is because a process of mechanically operating is established by converting a plurality of model figures into a formal language and applying verification technology on the formal language or extraction technology on the formal language.

Additionally, a partial improvement proposal of a system can be made without depending on each person or skill. This is because designs similar to a prescribed pattern design are extracted from an existing system and compared quantitatively based upon a KPI calculated from an execution log so as to determine superiority and inferiority of those similar designs.

Moreover, a risk and an advantage resulting from the improvement can be evaluated quantitatively. This is because test data prior to improvement are applied to an improved design and passed tests can be grasped in number.

Furthermore, a portion of replacement candidates in an existing system and effects of the replacement can be digitized precisely. This is because derivative designs are automatically generated in addition to an original design of a skilled person so as to increase designs used for verification. Moreover, a possible improvement can effectively be found from designs of an unskilled person by using a log. Additionally, a design burden on a skilled person can be reduced by automatically generating derivative designs.

Next, a second embodiment of the present invention will be described in detail with reference to the drawings.

Figures 26, 27:
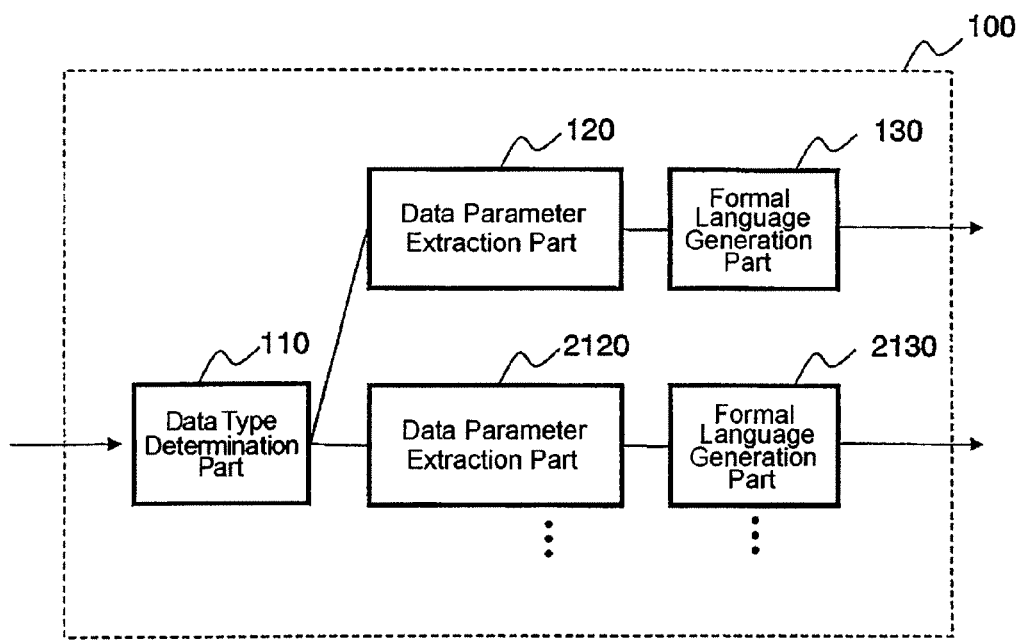
FIG. 26 is an explanatory diagram showing improvement value acquired according to Example 1.
FIG. 27 is a block diagram showing a configuration of a formal language conversion part 100 according to a second embodiment.

FIG. 27 is a block diagram showing a configuration of a formal language conversion part 100 according to a second embodiment.

Figure 28:
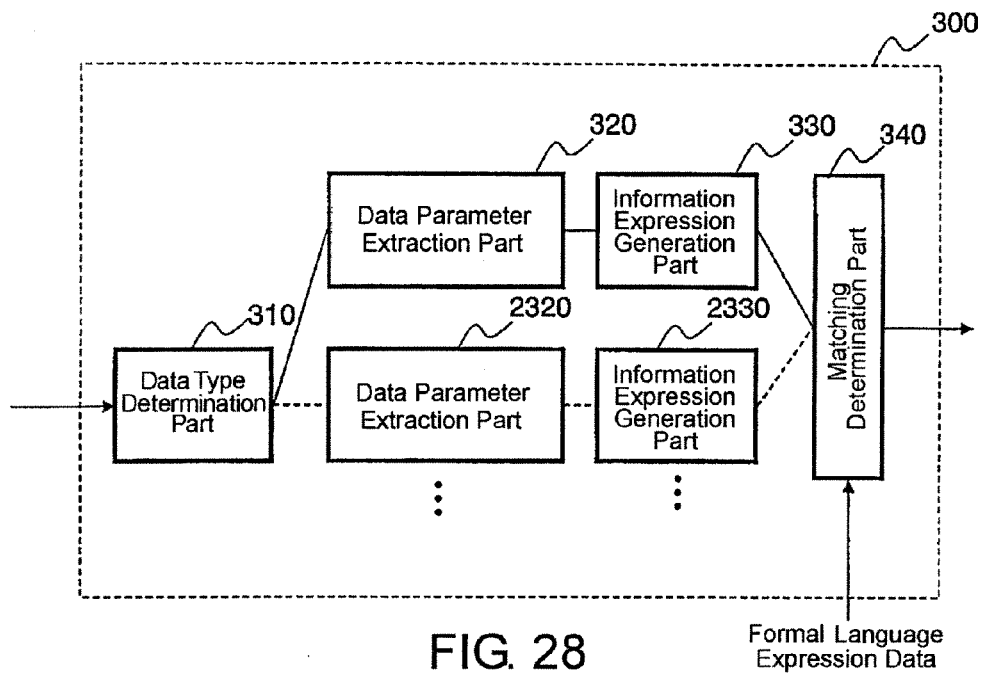
FIG. 28 is a block diagram showing a configuration of a design extraction part 300 according to the second embodiment.

FIG. 28 is a block diagram showing a configuration of a design extraction part 300 according to the second embodiment.

Referring to FIGS. 27 and 28, a model verification system according to the second embodiment of the present invention includes a data parameter extraction part 2120 and a formal language generation part 2130 in the formal language conversion part 100 (FIG. 27) and a data parameter extraction part 2320 and an information expression generation part 2330 in the design extraction part 300 (FIG. 28) in addition to the model verification system of the first embodiment.

The respective parts roughly operate as follows: The same operations as the model verification system of the first embodiment will be omitted from the following explanation, in which differences between the first embodiment and the second embodiment are described.

The data parameter extraction part 2120 extracts, in addition to the service components and the calling order, interface names from a sequence diagram (see FIG. 29), which is a model figure (process of Step S102).

The formal language generation part 2130 generates an XML schema capable of verifying an information expression described in BPEL 2.0 (process of Step S104).

The data parameter extraction part 2320 operates in the same manner as the data parameter extraction part 2120.

The information expression generation part 2330 generates information description expression data described in BPEL 2.0 based upon the extracted parameters.

Operations other than the above are the same as the operations of the model verification system of the first embodiment.

Next, advantageous effects of the embodiment of the present invention will be described.

The present embodiment can apply to BPEL 2.0. The present embodiment is configured to analyze a history of using information, such as browsing and searching, and to sort the importance. Therefore, information can be ranked without the need of any user's additional operation.

EXAMPLE 1

Next, an operation of the first embodiment will be described along with specific examples.

Description is made about an operation of the first embodiment which may be called Example 1 and in which the model figure is a sequence diagram of UML, the formal language expression is an XML schema, and the information description expression is XML.

FIG. 25 is an explanatory diagram schematically showing increment and quantification of a schema in Example 1. In the example of FIG. 25, it is assumed that parameters are extracted such that the service components are A, B, and C, and that B, C, and A are sequentially called in the calling order. Furthermore, it is assumed that a period of time for a consecutive process starting at B and ending at A is 50 ms.

The model verification system converts a sequence diagram, which is given as an input, into a formal language expression in the XML schema format according to the correspondence table. The XML schema indicating the order of B, C, and A is as follows. FIG. 25 only illustrates a primary portion.

```
<xsd:element name="pattern 1">
<xsd:complexType>
<xsd:sequence>
<xsd:element ref="B"/>
<xsd:element ref="C"/>
<xsd:element ref="A"/>
</xsd:sequence>
</xsd:complexType>
</xsd>
```

Then a formal language increment is performed in connection with this standard schema so as to generate a derivative schema as formal language expression data of a derivative design.

The following two patterns illustrate a pattern in which an element acquired at Step S201 has been added.

[Addition Derivative Pattern 1]
<xsd:element name="pattern2">
<xsd:complexType>
<xsd:sequence>
<xsd:element ref="B"/>
<xsd:any>
<xsd:element ref="C"/>
<xsd:element ref="A"/>
</xsd:sequence>
</xsd:complexType>
</xsd>
[Addition Derivative Pattern 2]
<xsd:element name="pattern3">
<xsd:complexType>
<xsd:sequence>
<xsd:element ref="B"/>
<xsd:element ref="C"/>
<xsd:any>
<xsd:element ref="A"/>
</xsd:sequence>
</xsd:complexType>
</xsd>

Next, exemplification is made about a pattern obtained by changing (replacing) an element acquired at Step S202.
[Replacement Derivative Pattern]
<xsd:element name="pattern4">
<xsd:complexType>
<xsd: sequence>
<xsd:element ref="B"/>
<xsd:element ref="any"/>
<xsd:element ref="A"/>
</xsd:sequence>
</xsd:complexType>
</xsd>

Next, a pattern obtained by deleting an element acquired at Step S203 is exemplified.
[Deletion Derivative Pattern]
<xsd:element name="pattern5">
<xsd:complexType>
<xsd:sequence>
<xsd:element ref="B"/>
<xsd:element ref="A"/>
</xsd:sequence>
</xsd:complexType>
</xsd>

Next, the following pattern illustrates a combined pattern acquired at Step S204. In the pattern of the illustrated schema, B has been deleted, and C has been replaced with "any."
[Combination Derivative Pattern]
<xsd:element name="pattern6">
<xsd:complexType>
<xsd:sequence>
<xsd:any/>
<xsd:element ref="A"/>
</xsd:sequence>
</xsd:complexType>
</xsd>

Meanwhile, it is assumed that the following seven model figures having an extension of "uml" or "uml2" are stored in the existing system design accumulation part 1100.
1. A→B
2. B→A
3. B→E→A
4. B→D→C→A
5. D→B→C→A
6. B→C→D→A
7. B→C→A→D→F The design extraction part 300 specifies the format of each of the model figures, extracts parameters, and generates information expression data in the XML format as information description expression data at the information expression generation part 330.

For example, the model figure of A→B is expressed by the following XML instance.
<process>
<A/>
<B/>
</process>

Furthermore, for example, the model figure of B→A is expressed by the following XML instance.
<process>
<B/>
<A/>
</process>

With regard to other model figures, the information expression generation part 330 also generates information expression data in the same manner.

Then the matching determination part 340 makes a comparison based upon "pattern5" of [Deletion Derivative Pattern] acquired at Step S203 and "pattern6" of [Combination Derivative Pattern]. For example, "pattern5" is compared.

The value of the name attribute of the root element of the selected pattern ("pattern5") is replaced with the root tag name of the XML instance ("process") so as to generate an XML schema (process of Step S306).
<xsd:schema xmlns:xsd="http://www.w3.org/2001/XMLSchema">
<xsd:element name="process">
<xsd:complexType>
<xsd:sequence>
<xsd:element ref="B"/>
<xsd:element ref="A"/>
</xsd:sequence>
</xsd:complexType>
</xsd:element>
</xsd:schema>

Then data of each of the model figures in the information expression format is evaluated with the formal language of the pattern. The evaluation uses an XML parser for reading an XML document and converting it into a document object model on a memory, e.g., Apache Xerces, to verify whether the XML instance is described in conformity to the type of the XML schema.

As a result of the verification, the model figure of B→A passes while the model figure of A→B fails. Therefore, a KPI relating to the model figure of B→A is calculated from the log. The reasons why the model figure of B→A passes while the model figure of A→B fails are as follows: The "sequence" tag of the XML schema indicates the restriction in which inner elements appear in the order named. In this case, the restriction is that B and A appear in the order named. Thus, the model figure of A→B fails.

If the evaluation has not been completed for all of the seven model figures, the process is repeated again from Step S304. When the model figures are grouped by the number of elements, four groups including two elements, three elements, four elements, and five elements, respectively, are generated. Therefore, the process is repeated four times.

Then, in order to calculate a KPI value for quantification of the model figure of B→A, a KPI ID held by the pattern is first derived from the "Pattern" table (see FIG. 15). A design indicated by ID1 of the "Pattern" table is a standard pattern that calls B, C, and A in the order named.

The "Pattern" table of FIG. 15 describes that the design "X1.uml" with an ID of 1 has a KPI value defined by "ID1" of the "KPI" table. Referring to the "KPI" table of FIG. 20, the KPI calculation function is described as being f(string[], string[]). Thus, it can be seen that two arrays of character strings are needed as arguments.

Meanwhile, referring to the "Instance" table of FIG. 18, a design corresponding to the model figure of B→A is ID1 of the "Instance" table. A log of the instance relating to ID1 is described in the "LOG" table.

Referring to the "LOG" table of FIG. 19, it can be seen that logs of ID1, ID2, and ID9 relate to Instance ID1. In this case, it can be seen that the stored location (file location) of the log file is /log/appl.log. This log includes log items in the following format.
20:30:00 urn:/abc/def/s1 key=start_time value=60
20:30:08 urn:/abc/def/s1 key=incident value=101
20:30:35 urn:/abc/def/s1 key=end_time value=135
20:30:40 urn:/abc/def/s1 key=start_time value=100
20:30:42 urn:/abc/def/s1 key=incident value=102
20:31:15 urn:/abc/def/s1 key=end_time value=175

Referring to the extraction matching character string of ID1 of the "LOG" table, there are two bracketed parts, such as (¥w) and (¥d). When the extraction matching character string is applied to the first line of the log, "20:30:00" is extracted by (¥w) and "60" is extracted by (¥d). As the log includes a plurality of lines, the results are stored in an array of {"20:30:00", "20:30:40"} for (¥w) and in an array of (60, 100) for (¥d).

Similarly, the extraction matching character string of ID2 of the "LOG" table is applied to acquire an array of {"20:30:35", "20:31:15"} and an array of {135, 175}.

Functions and input data described in the "KPI_VALUE_FROM" table are used to calculate a KPI value. At ID of this table, the array of {"20:30:00", "20:30:40"} is provided as the first argument of the function f(string[], string[]), and the array of {"20:30:35", "20:31:15"} is provided as the second argument. Furthermore, the following logic may be used to calculate a KPI value.
def f(starts, ends) {
var total=0;
for (var i=0; i<starts.length; i++) {
total+=ends[i]−starts[i];
}
return total/starts.length;
}

Thus, the calculated KPI value of the model figure of B→A is 35. Similarly, a KPI is calculated from the log for designs matched with the pattern. Finally, the following values are acquired (the extraction results of FIG. 25).
B→A: 35
B→E→A: 5
B→D→C→A: 40
B→C→D→A: 55

When the simplicity of the number of elements is taken into consideration, the following ROI values are acquired as shown in FIG. 26.
B→A: 50/35*3/2
B→E→A: 50/35*3/3
B→D→C→A: 50/40*3/4
B→C→D→A: 50/55*3/4

Accordingly, when the design using B→E→A is replaced with B→A, improvement value of the ROI can be increased 1.5 times.

In order to verify whether no practical problem arises if the elements are replaced as described above, a replacement test (operation verification) is performed with reference to the "TEST" table.

The model figure of B→E→A corresponds to ID2 of the "Instance" table. Only test data for confirming operation of B→E→A are selected from among data used in the test processes from ID6 to ID8 of the "TEST" table and applied to a test for executing B→A. When no problem arises in this verification, the elements can be replaced.

EXAMPLE 2

A second example of the present invention in which model figures are expressed in the BPEL language will be described along with specific values with reference to FIGS. 29 and 30.

First, the data type determination part 110 collates an extension ".seq" of a file with the correspondence table of FIG. 23 (Step S101) to determine whether or not the file can be managed.

If the file is manageable, the data parameter extraction part 2120 extracts parameters of the service components, the interfaces, and the calling order from a sequence diagram (Step S103).

Figure 29:
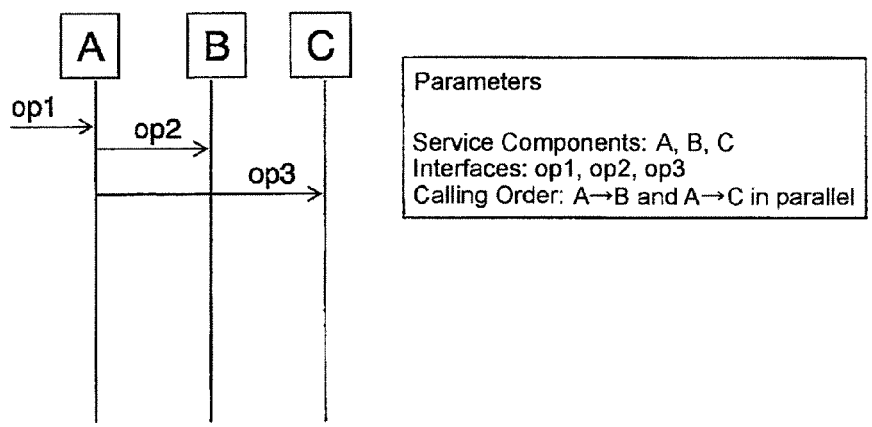
FIG. 29 is a sequence diagram showing an input design drawing of Example 2.

In the example of FIG. 29, there are extracted parameters of the service components A, B, and C, the interfaces op1, op2, and op3, and the calling order in which a call from A to B and a call from A to C are made in parallel.

When those parameters are provided to the information expression generation part 2330 (see FIG. 28), an information expression in the BPEL format is acquired. The acquired information expression in the BPEL format is as follows:
<flow>
</flow>

Meanwhile, in the formal language generation part 2130 of FIG. 27, an XML schema for verifying the aforementioned information expression is generated as shown in FIG. 30. As with Example 1, designs that match a similar pattern can be extracted and improved by the formal language increment part.

EXAMPLE 3

A third example of the present invention in which an XPath form is used in the formal language expression will be described along with specific values.

Figure 31:
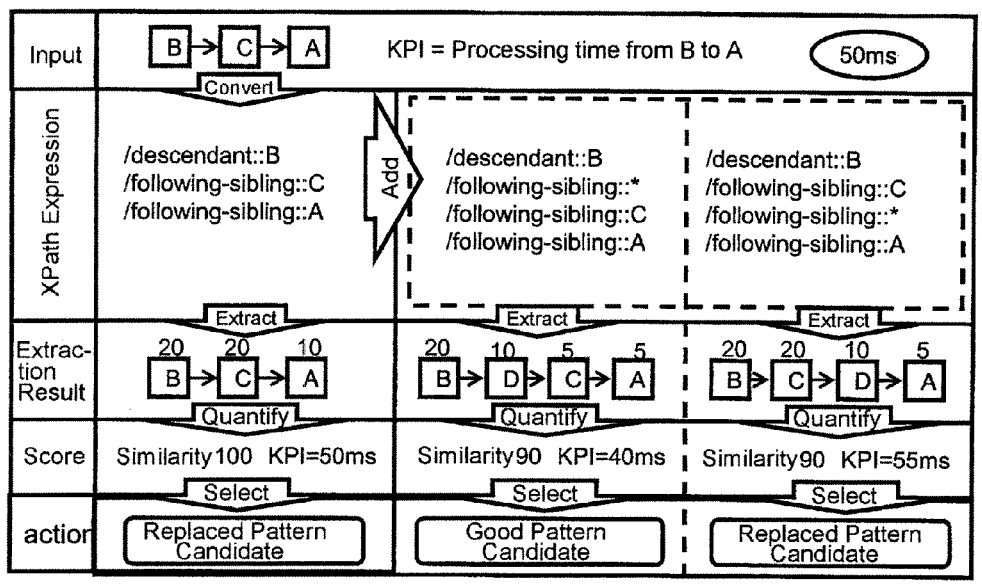
FIG. 31 is an explanatory diagram schematically showing multiplication and quantification of a schema of Example 3.

FIG. 31 is an explanatory diagram schematically showing increment of an XPath form in Example 3. In the example of FIG. 31, it is assumed that parameters are extracted such that the service components are A, B, and C, and that B, C, and A are sequentially called in the calling order.

The model verification system converts a sequence diagram, which is an input, into a formal language expression in the XPath format according to the correspondence table (see FIG. 33). The XPath form indicating the order of B, C, and A is as follows. FIG. 31 only illustrates a primary portion.
/descendant::B/following-sibling::C/following-sibling::A Then a formal language increment is performed with respect to this standard XPath form so as to generate a derivative XPath form as formal language expression data of a derivative design.

The following two patterns illustrate a pattern in which an element acquired at Step S201 has been added.

[XPath Addition Derivative Pattern 1]
/descendant::B/following-sibling::*/followingsibling::C/following-sibling::A
[XPath Addition Derivative Pattern 2]
/descendant::B/following-sibling::C/following-sibling::*/following-sibling::A Next, the following pattern illustrates a pattern in which a change (replacement) of an element acquired at Step S202 has been made.
[XPath Replacement Derivative Pattern]
/descendant::B/following-sibling::*/ following-sibling::A Next, the following pattern illustrates a pattern in which an element acquired at Step S203 has been deleted.
[XPath Deletion Derivative Pattern]
/descendant::B /following-sibling::A Next, the following pattern illustrates a combined pattern acquired at Step S204.

In the pattern of the illustrated XPath form, B has been deleted, and C has been replaced with "*."
/descendant::*/following-sibling::A In each of the XPath form, a descendant-child may be used instead of a descendant. Furthermore, a semantically equivalent formula may be used. For example,
/descendant::A /preceding-sibling::B
may be used for
/descendant::B /following-sibling::A Meanwhile, like in Example 1, the system design accumulation part 1100 generates information expression data in the XML format from the model figure. For example, the model figure of A→B is expressed by the following XML instance.
<process>
<A/>
<B/>
</process>

Furthermore, for example, the model figure of B→A is expressed by the following XML instance.
<process>
<B/>
<A/>
</process>

Then the matching determination part 340 evaluates two XML instances by the use of the XPath form of [XPath Deletion Derivative Pattern] acquired at Step S203. The evaluation is performed in a processor by the use of a processing program, e.g., Apache Xalan, which reads an XML document, convert the same into a document object model on a memory, and evaluates the same with a given XPath form.

As a result of the verification, the model figure of B→A passes while the model figure of A→B fails. The reasons why the model figure of B→A passes while the model figure of A→B fails are as follows: The "following-sibling" axis of the)(Path form indicates the restriction in which elements appear in the order named. In this case, the restriction is that B and A appear in the order named. Thus, the model figure of A→B fails.

As described in the above embodiments and examples, according to the present invention, there can be provided a model verification system that can automatically collect an original design as a conversion resource of the formal language and a derivative design that is different from the original design for a model verification, by converting design data expressed in the form of diagrams into a formal language and automatically increasing variations in the formal language.

With use of this model verification system, a program of a good design can be determined and used effectively in comparison with a plurality of design programs of systems with reference to design information that has implemented an existing system.

Meanwhile, a good design that has been accumulated becomes obsolete along with development of technology. Therefore, a good design that has been accumulated is compared with a design of new technology, making it possible to properly determine which one of the designs is better. Similarly, it is possible to determine a design that meets conditions for a good design that vary depending upon the system.

Furthermore, a determination of a design is mechanically made without resort to the human subjectivity. Thus, it is possible to preclude the personalization, to digitize the comparison, to reduce a period of time for the comparison, and to eliminate an oversight of the determination.

Additionally, the cost performance (cost-effectiveness) of improvement of a model design in an existing system can be presented in numerical values.

The respective parts of the aforementioned model verification system are implemented by a combination of hardware and software. Specifically, a model verification program is expanded on a RAM (Random Access Memory). The respective parts and various means are implemented by operating hardware such as a controller (CPU) based upon the program. Furthermore, the program may be recorded on and distributed with a storage medium. The program recorded on the recording medium is read into an auxiliary storage device such as an HDD via a wire, a radio, or the recording medium itself so as to operate the controller and the like.

Furthermore, specific configurations of the present invention are not limited to the aforementioned embodiments. The present invention covers any changes in configuration or operation without departing from the spirit of the present invention.

Figure 34:
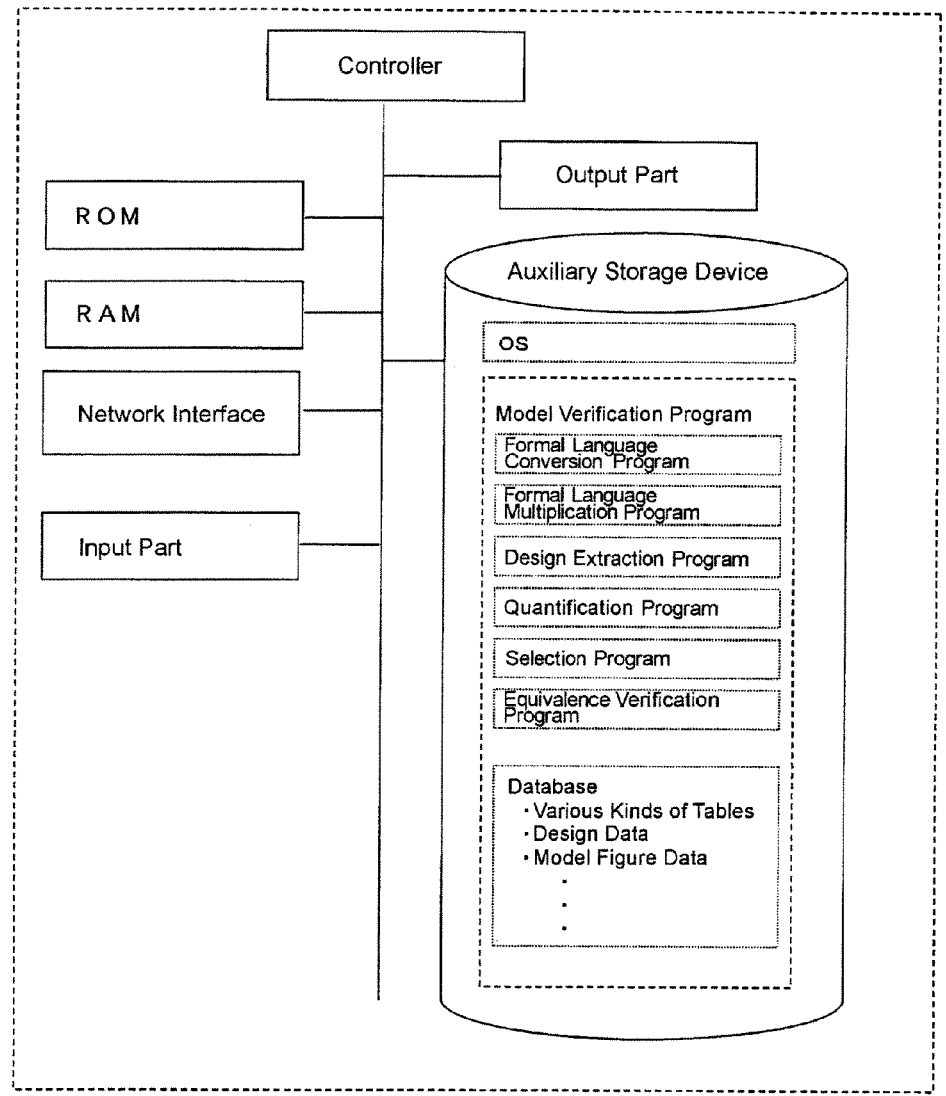
FIG. 34 is a configuration diagram illustrating a model verification system constructed on a computer.

In a specific example, for instance, a model verification system can be configured by using a general computer as shown in FIG. 34. In this computer, respective programs cooperate with each other to generate formal language data and derivative design data, to perform various verifications, and to output refactored design data (rebuilt program data). The outputted design data operate as a system after they are incorporated into the system and refactored. This system has advantageous effects of improvement in processing speed, reduction of required resources, and the like as compared to the system without refactoring.

Furthermore, in another example, a model verification system can be implemented by using a general server. A model verification system built on a server is connected to a database, connected via a network, for storing a design of an existing system. Various kinds of programs stored in an auxiliary storage device are expanded on a RAM and read into a controller so as to operate as a model verification system. The controller functions as formal language conversion means, formal language multiplication means, design extraction means, quantification means, selection means, equivalence verification means, and the like based upon various kinds of programs read into the RAM. Furthermore, a pattern accumulation part, an existing system design accumulation part, an existing system execution log accumulation part, and an existing system test data accumulation part are provided in an external database and operated therein. A correspondence table accumulation part and a KPI calculation method storage part are provided in an internal auxiliary storage device and operated therein.

A server that operates as a model verification system acquires model figure data (original data), which is a standard for evaluation generated by a skilled person or the like and has been selected via an input part or a network interface, from an external database. The server converts the model figure data into formal language expression data based upon an expression format of a predetermined formal language. The server adds a modification to a component of the formal language and/or attribute information to generate formal language expression data of a derivative design in a virtual manner. With use of the generated data, the server converts model figure data, which are existing designed data, into information description expression data in an information expression format corresponding to an expression format of the generated formal language expression data. The server determines the degree of the matching. The server calculates a KPI value of the matched data with use of log data of the existing design after it determines the degree of the matching. The server stores the KPI value in an external database for quantification of evaluation. Then, based upon the KPI value of the quantified data, the server sets a good design as a replacing candidate and a design having a value lower than the good design as a replaced candidate. Thus, the server selects candidates for replacement and presents them to an operator. The data of the existing design can effectively be used, and an existing system having a high value for consideration of replacement can be identified. Then, with test data, the server verifies the deficiency and conformity of operation when the replaced candidate being considered is replaced with the replacing candidate.

The above embodiment may be described in another expression as follows: An information processing system that operates as a model verification system has a storage part operable to store a model verification program, a network interface operable to permit communication with an external database, and a controller operable in accordance with a program. The model verification program allows the controller to function as formal language conversion means for converting model figure data generated in a human visible form, which indicate a design of a computer program, into formal language expression data based upon an expression format of a predetermined formal language and formal language multiplication means for adding a modification to a component of the formal language and/or attribute information on the formal language expression data converted by the formal language conversion means to generate formal language expression data of a derivative design.

Furthermore, the model verification program operates the controller to allow the formal language conversion means to function as data type determination means for determining an expression format of a formal language into which the model figure data are converted based upon an extension and/or type information defined at a header of a file, data parameter extraction means for extracting a parameter that specifies the model figure among the model figure data from characteristics of the formal language determined at the data type determination means, and formal language generation means for generating the formal language expression data based upon the parameter extracted at the data parameter extraction means.

Moreover, the model verification program operates the controller to allow the formal language multiplication means to function as any or all of element multiplication means for inserting any component and/or data indicative of attribute information to the formal language expression data to generate the formal language expression data of the derivative design, element replacement means for replacing part of the formal language expression data with any component and/or data indicative of attribute information to generate the formal language expression data of the derivative design, element deletion means for deleting any component and/or data indicative of attribute information from part of the formal language expression data to generate the formal language expression data of the derivative design, and integration means for combining output results of the element multiplication means, the element replacement means, and the element deletion means to generate the formal language expression data of the derivative design.

Furthermore, the model verification program allows the controller to function as design extraction means for converting model figure data, which are existing designed data, into information description expression data in an information expression format corresponding to the expression format of the formal language expression data converted at the formal language conversion means and for determining whether the formal language expression data and the information description expression data match each other.

Moreover, the model verification program allows the controller to function as quantification means for acquiring a recommended KPI range value, a KPI calculation function, and existing design log data based upon the matching result of the matching determination means and for calculating a KPI value of the matched information description expression data.

Furthermore, the model verification program allows the controller to function as selection means for separating a replacing candidate and a replaced candidate based upon the KPI value of the information description expression data acquired by the quantification means. At that time, a replacing candidate and a replaced candidate associated with each other as a result of comparison of a selected and arranged design and the original design acquired at the formal language conversion part may inversely be converted into a model figure and may be stored in the pattern accumulation part.

Moreover, the model verification program allows the controller to function as equivalence verification means for performing an operation verification of the selection result of the replacing candidate and the replaced candidate at the selection means with use of test data stored in the existing system test data accumulation part. At that time, test data of a link source may be acquired from the existing system test data accumulation part. A test may be conducted on a design of a link target. The link source that has failed the test may change its link target. A test may be conducted again while link source data are provided to a new link target. The link source that has failed the test with the changed link target may be marked as being impossible to improve. The result may be stored in the pattern accumulation part. Furthermore, replacement of the design of the link source finally acquired with the design of the link target is ensured by the equivalence verification means. Therefore, it is possible to propose to a customer that has been provided with the existing system that the existing system including the design of the link source can be improved with the design of the link target, along with the effects of the improvement proposal which have been digitized. This is because the improvement effects can be expressed in numbers as the quantification means arranges the link source and the link target by the KPI values. In this case, an investment for improvement and return effects can clearly be expressed in numbers, exerting remarkable effects on the proposal of improvement of the system.

The model verification system may use, as the formal language expression data, data in an XML schema format used for grammar check and extraction check or data in an XPath format for extracting part of sentences of an XML language and/or a BPEL language. Additionally, the digitization of the ROI uses a formula of {(ROI value)=(KPI of a standard pattern)/(KPI of an XML instance)*(the number of components of the standard pattern)/(the number of components of the XML instance)}. Therefore, a design model can be verified for the existing systems in general.

Additionally, the model verification system can preclude habits or tendency of skilled persons and can refactor the existing system with an evaluation that has truly been desired by a customer with regard to many parameters such as reduction of resources and reduction of a processing time. In other words, the model verification system provides a mechanism for automatically and properly evaluating a program of an existing system and performing a replacement or a modification if possible, and also a mechanism for automatically generating a derivative design to support a skilled person.

The present invention is applicable to use for finding similar data from a database in which a plurality of pieces of design data are stored as electronic data, or use for determining superiority and inferiority of similar designs with use of log data to improve the designs.

This application claims the benefit of priority from Japanese patent application No. 2009-115270, filed on May 12, 2009, and Japanese patent application No. 2009-203295, filed on Sep. 3, 2009, the disclosure of which is incorporated herein in its entirety by reference.

[Reference Numerals]
100 formal language conversion part (formal language conversion means)
110 data type determination part (data type determination means)
120 data parameter extraction part (data parameter extraction means)
130 formal language generation part (formal language generation means)
200 formal language increment part (formal language multiplication means)
210 element multiplication part (element multiplication means)
220 element replacement part (element replacement means)
230 element deletion part (element deletion means)
300 design extraction part (data type determination means)
310 data type determination part (data type determination means)
320 data parameter extraction part (data parameter extraction means)
330 information expression generation part (information expression generation means)
340 matching determination part (matching determination means)
400 quantification part (quantification means)
410 matching pair management part (matching pair management means)
420 log management part (log management means)
430 KPI calculation part (KPI calculation means)
500 separation part (selection means)
510 replacement target management part (replacement target management means)
520 ROI calculation part (ROI calculation means)
600 equivalence verification part (equivalence verification means)
610 test data extraction part (test data extraction means)
620 test execution part (test execution means)
1000 pattern accumulation part (pattern accumulation means)
1100 existing system design accumulation part (existing system design accumulation means)
1200 existing system execution log accumulation part (existing system execution log accumulation means)
1300 KPI calculation method storage part (KPI calculation method storage means)
1400 existing system test data accumulation part (existing system test data accumulation means)
1500 correspondence table accumulation part (correspondence table accumulation means)

The invention claimed is:

1. A model verification system built with a computer system including a processor, a storage section, an input part, and an output part, the model verification system comprising:
 a pattern accumulation part built with the storage section, and configured to acquire an original model figure data registered as a design pattern in association with a program by the input part;
 a formal language conversion part operated with the processor and configured to convert the original model figure data registered into formal language expression data based upon an expression format of a predetermined formal language;
 a formal language increment part operated with the processor, and configured to add formal language expression data of a derivative design by adding a modification to a component of the formal language on the converted formal language expression data, and to store the formal language expression data of the derivative design to the pattern accumulation part; and
 the output part can output the formal language expression data of the derivative design; and
 wherein the model verification system, further comprises:
 a design extraction part which includes:
 determining an information description expression format into which the model figure data, which are existing designed data, are converted based upon an extension and/or type information defined at a header of a file,
 extracting a parameter that specifies the model figure among the model figure data from characteristics of the determined information description expression format;
 generating information description expression data based upon the parameter extracted, and
 determining whether or not the formal language expression data is matched with the information description expression data;
 a quantification part which includes:
 storing a pattern ID and an instance ID included in a determination result where the matching has been determined;
 acquiring existing design log data that are matched with the instance ID managed by a matching pair management part, and
 acquiring a recommended Key performance indicator (KPI) range value and a KPI calculation function that match the pattern ID managed by the matching pair management part and applying the existing design log data to the recommended KPI range value and calculating a KPI value of the information description expression data;
 a separation part which includes:
 comparing KPI values that are equivalent and comparable in a plurality of pieces of the information description expression data quantified by the quantification part,
 setting information description expression data having a high KPI value as a replacing candidate,
 setting other information description expression data as a replaced candidates, and store the relationship between the candidates, and calculating a ratio of KPI values of the replacing candidate and the replaced candidates and Return On Investment (ROI) value in a case of the replacement.

2. The model verification system as recited in claim 1, wherein:
the formal language increment part includes at least one of:
inserting any component to the formal language expression data to generate the formal language expression data of the derivative design,
replacing component of the formal language expression data with any component to generate the formal language expression data of the derivative design,
deleting any component from the formal language expression data to generate the formal language expression data of the derivative design, and
combining output results of the element of the insertion, the replacement, and the deletion to generate the formal language expression data of the derivative design.

3. The model verification system as recited in claim 1, further comprising:
converting model figure data, which are existing designed data, into information description expression data in an information expression format corresponding to the expression format of the formal language expression data converted at the formal language conversion part and determining whether or not the formal language expression data and the information description expression data are matched with each other.

4. The model verification system as recited in claim 1, wherein the separation part further includes:
separating a replacing candidate and a replaced candidate based upon the KPI value of the information description expression data acquired by the quantification part.

5. The model verification system as recited in claim 4, further comprising:
performing an operation verification of the selection result of the replacing candidate and the replaced candidates at the separation part with use of test data.

6. The model verification system as recited in claim 1, further comprising an equivalence verification part which includes:
extracting a test case that uses only a portion of the replaced candidates that matches a pattern and to acquire input data required to execute the test case and verification data indicative of an expected result of the execution, and
applying the input data for the test and the verification data that have been acquired for each of the replaced candidates to the test case of the replacing candidate to perform an operation verification of whether the replaced candidate can be replaced with the replacing candidate.

7. The model verification system as recited in claim 1, wherein the formal language expression data are data in an Extensible Markup Language (XML) schema format used for grammar check and extraction check of an XML and/or a Business Process Execution Language (BPEL).

8. The model verification system as recited in claim 1, wherein the formal language expression data are data in an XPath format used for grammar check and extraction check of an XML and/or a BPEL.

9. A model verification method by a computer system including a processor, a storage section, an input part, and an output part, the model verification method comprising:
acquiring an original model figure data registered as a design pattern in association with a program to the storage section by the input part;
converting the original model figure data by the processor into formal language expression data based upon an expression format of a predetermined formal language;
adding formal language expression data of a derivative design by the processor, by adding a modification to a component of the formal language on the converted formal language expression data, and storing the formal language expression data of the derivative design to the storage section; and
verifying the original model figure data with use of the generated information processor and outputting verifying result by the output part;
the conversion to the formal language expression data includes:
determining an expression format of a formal language into which the original model figure data are converted based upon an extension and/or type information defined at a header of a file,
extracting a parameter that specifies the model figure among the original model figure data from characteristics of the determined formal language,
generating the formal language expression data based upon the extracted parameter to verify the original model figure data with use of the generated information;
acquiring a recommended Key performance indicator (KPI) range value, a KPI calculation function, and existing design log data based upon the matching result;
calculating a KPI value of the matched information description expression data, to verify the model figure data with use of the calculated information;
generating information for selecting a replacing candidate and a replaced candidate based upon the KPI value of the information description expression data, to verify the model figure data with use of the generated information,
comparing KPI values that are equivalent and comparable in a plurality of pieces of the information description expression data quantified by the quantification part,
setting information description expression data having a high KPI value as a replacing candidate,
setting other information description expression data as replaced candidates, and store the relationship between the candidates, and
calculating a ratio of KPI values of the replacing candidate and the replaced candidates and Return On Investment (ROI) value in a case of the replacement.

10. The model verification method as recited in claim 9, wherein the generation of the formal language expression data of the derivative design includes:
inserting any component to the formal language expression data to generate the formal language expression data of the derivative design, or
replacing component of the formal language expression data with any component to generate the formal language expression data of the derivative design,
or
deleting any component and/or from the formal language expression data to generate the formal language expression data of the derivative design, or
combining the above generated results to generate the formal language expression data of the derivative design.

11. The model verification method as recited in claim 9, comprising:
converting model figure data, which are existing designed data, into information description expression data in an information expression format corresponding to the expression format of the converted formal language expression data and determining whether the formal language expression data and the information description expression data match each other, to verify the model figure data with use of the generated information;

performing an operation verification of the replacing candidate and the replaced candidate with use of test data, to verify the model figure data;

using, as the formal language expression data, data in an XML schema format or an XPath format used for grammar check and extraction check of an XML language and/or a BPEL to verify the model figure data.

12. A non-transitory computer-readable recording medium having a model verification program recorded thereon, allowing a controller of an information processing apparatus to function as, comprising:

a pattern accumulation part operable to acquire an original model figure data registered as a design pattern in association with a program;

a formal language conversion part operable to convert the original model figure data into formal language expression data based upon an expression format of a predetermined formal language; and a formal language increment part operable to add formal language expression data of a derivative design by add a modification to a component of the formal language on the converted formal language expression data, and to store the formal language expression data of the derivative design to the pattern accumulation part;

a data type determination part operable to determine an expression format of a formal language into which the original model figure data are converted based upon an extension and/or type information defined at a header of a file, a data parameter extraction part operable to extract a parameter that specifies the model figure among the original model figure data from characteristics of the formal language determined at the data type determination part, a formal language generation part operable to generate the formal language expression data based upon the parameter extracted at the data parameter extraction part;

wherein the model verification program allows the controller to further function as:

a quantification part operable to acquire a recommended Key Performance Indicator (KPI) range value, a KPI calculation function, and existing design log data based upon the matching result of the design extraction part and to calculate a KPI value of the matched information description expression data;

a replacement target management part operable to compare KPI values that are equivalent and comparable in a plurality of pieces of the information description expression data quantified by the quantification part, set information description expression data having a high KPI value as a replacing candidate, set other information description expression data as a replaced candidates, and store the relationship between the candidates;

a separation part operable to separate a replacing candidate and a replaced candidate based upon the KPI value of the information description expression data acquired by the quantification part; and a Return On Investment (ROI) calculation part operable to calculate a ratio of KPI values of the replacing candidate and the replaced candidates and to calculate a Return On Investment (ROI) value in a case of the replacement.

13. The recording medium having a model verification program recorded thereon as recited in claim 12, wherein:

the model verification program further allows the formal language increment part to function as at least one of:

an element increment part operable to insert any component to the formal language expression data to generate the formal language expression data of the derivative design, an element replacement part operable to replace component of the formal language expression data with any component and/or to generate the formal language expression data of the derivative design, an element deletion part operable to delete any component the formal language expression data to generate the formal language expression data of the derivative design, and an integration part operable to combine output results of the element multiplication part, the element replacement part, and the element deletion part to generate the formal language expression data of the derivative design.

14. The recording medium having a model verification program recorded thereon as recited in claim 12, allowing the controller to further function as:

a design extraction part operable to convert model figure data, which are existing designed data, into information description expression data in an information expression format corresponding to the expression format of the formal language expression data converted at the formal language conversion part and to determine whether the formal language expression data and the information description expression data are matched with each other;

an equivalence verification part operable to perform an operation verification of the selection result of the replacing candidate and the replaced candidate at the separation part with use of test data;

wherein: data in an XML (Extensible Markup Language) schema format or an XPath format used for grammar check and extraction check of an XML and/or a BPEL (Business Process Execution Language) are used as the formal language expression data.

15. The recording medium having a model verification program recorded thereon as recited in claim 12, wherein the calculation of the value used in quantification for verification of the original model figure data uses a formula:

{ (ROI (Return On Investment) value)=(KPI of a standard pattern)/(KPI of an XML instance)*(the number of components of the standard pattern)/(the number of components of the XML instance)}.

* * * * *